(12) United States Patent
Misawa

(10) Patent No.: US 7,405,753 B2
(45) Date of Patent: Jul. 29, 2008

(54) DATA STORAGE MANAGEMENT SYSTEM FOR CAMERA AND CAMERA SYSTEM

(75) Inventor: Takeshi Misawa, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 660 days.

(21) Appl. No.: 10/300,888

(22) Filed: Nov. 21, 2002

(65) Prior Publication Data
US 2003/0095196 A1 May 22, 2003

(30) Foreign Application Priority Data
Nov. 21, 2001 (JP) .............................. 2001-356650

(51) Int. Cl.
*H04N 5/225* (2006.01)
*H04N 9/04* (2006.01)
*H04N 5/76* (2006.01)

(52) U.S. Cl. .............................. 348/231.2; 348/231.99; 348/231.3; 348/207.1; 348/207.99

(58) Field of Classification Search ............. 348/207.1, 348/207.11, 207.99, 231.99, 231.2, 231.3, 348/231.6
See application file for complete search history.

(56) References Cited

U.S. PATENT DOCUMENTS

| | | | | |
|---|---|---|---|---|
| 5,640,203 A | * | 6/1997 | Wakui | 348/231.8 |
| 6,445,460 B1 | * | 9/2002 | Pavley | 358/1.15 |
| 6,832,275 B1 | * | 12/2004 | Aizawa | 710/62 |
| 6,965,403 B2 | * | 11/2005 | Endo | 348/231.2 |
| 7,123,295 B2 | * | 10/2006 | Baron et al. | 348/231.2 |
| 2003/0035054 A1 | * | 2/2003 | Ohmura | 348/231.2 |
| 2005/0158015 A1 | * | 7/2005 | Nakayama et al. | 386/4 |

FOREIGN PATENT DOCUMENTS

| | | |
|---|---|---|
| JP | 09312791 A | 12/1997 |
| JP | 11027627 A | 1/1999 |
| JP | 2000293974 A | 10/2000 |
| JP | 2001268424 A | 9/2001 |

* cited by examiner

*Primary Examiner*—Lin Ye
*Assistant Examiner*—Richard M Bemben
(74) *Attorney, Agent, or Firm*—Birch, Stewart, Kolasch & Birch, LLP

(57) ABSTRACT

The present invention provides a camera system that can easily make image data inhibited from being erased erasable when the image data are backed up. A personal computer loads an image file stored in a recording medium of the digital camera and a setting file in which setting states of various processes. When the loaded image data are stored in a hard disk, and when the value of a backup protection variable set by the setting file indicates protection of the stored image file, a read-only attribute of the image file is set. When the value of the automatic erasing variable set by the setting file indicates automatic erasing, and when the number of times of storage of the stored image file is equal to or larger than the number of times set by the setting file, the image file is erased from the recording medium.

49 Claims, 16 Drawing Sheets

DATA STORAGE MANAGEMENT SYSTEM FOR CAMERA AND CAMERA SYSTEM

BACKGROUND OF THE INVENTION

1. Field of the Invention

The present invention relates to a camera system, a digital camera, and a method for controlling a digital camera and, more particularly, to a camera system that makes backup data of image data obtained by photographing by a digital camera, a digital camera which can transfer image data obtained by photographing to the outside, and a method for controlling a digital camera.

2. Description of the Related Art

In recent years, digital cameras such as digital still cameras or digital video cameras have become popular. Such cameras pick the image of an object by using a solid-state image pickup element such as a CCD (Charge Coupled Device) that records digital image data indicating the object image obtained by the image pickup on a mobile recording medium such as a smart medium or a compact flash.

In these kinds of digital cameras, as a method for protecting image data recorded on the recording media, the following two methods are employed.

1. Pieces of image data to be protected are selected by a user one by one to give a read-only attribute to each selected image data.
2. Read-only attributes are given to all pieces of recorded image data at once.

Examples of the protect methods of the two types will be described below in detail. With reference to FIGS. 15A to 15D, a method for giving a read-only attribute to each selected piece of image data will be described below.

A user depresses a menu/execution switch (not shown) prepared for displaying a menu on an image monitor 40 constituted by a liquid crystal display or the like arranged on a digital camera. In accordance with this operation, a menu screen shown in FIG. 15A is displayed on the image monitor 40 of the digital camera.

The user selects a protect menu indicated by a key-shaped mark from the menu screen such that an operation switch (not shown) on which an arrow key indicating four moving directions, e.g., upper, lower, left, and right directions in a display area of the image monitor 40 is operated. In this manner, a protect menu shown in FIG. 15B is displayed on the image monitor 40 of the digital camera. Therefore, the user designates "1 frame set" of the protect menu by operating the operation switch. In accordance with this, on the image monitor 40 of the digital camera, an image indicated by image data recorded on a recording medium by photographing in advance is displayed as a thumbnail. For this reason, the user designates an image to be protected from the thumbnail by operating the operation switch. In accordance with the designation, a screen is displayed on the image monitor 40 of the digital camera. That screen urges the user to perform re-confirmation, as shown in FIG. 15C. When image data corresponding to a designated image is to be protected, the user depresses the menu/execution switch. When the image data are to be canceled, the user depresses a cancel/return switch (not shown).

When the user depresses the menu/execution switch, a read-only attribute is set with respect to image data corresponding to an image designated by the user in the digital camera to protect the image data, and a key-shaped mark is displayed at the upper right portion of the display area of the image monitor 40 as shown in FIG. 15D.

A method for giving read-only attributes to all pieces of recorded image data at once will be described below with reference to FIGS. 16A to 16C.

First, the user depresses the menu/execution switch. In accordance with this, a menu screen shown in FIG. 16A is displayed on the image monitor 40 of the digital camera.

The user selects a protect menu from the menu screen by operating the operation switch in the same manner as described above. In this manner, a protect menu shown in FIG. 16B is displayed on the image monitor 40 of the digital camera. In this state, the user designates "all frame set" of the protect menu by operating the operation switch. In accordance with this, a screen, which urges the user to perform re-confirmation shown in FIG. 16C, is displayed on the image monitor 40 of the digital camera. When all the pieces of recorded image data are protected at once, the user depresses the menu/execution switch. When the protection is canceled, the user depresses the cancel/return switch.

When the user depresses the menu/execution switch, in the digital camera, read-only attributes are set for all the pieces of recorded image data to protect the image data.

Even though a read-only attribute is given to the image data recorded on the recording medium to protect the image data by these methods, when the digital camera is connected to an external storage device such as a hard disk drive or an information terminal device such as a personal computer including a storage device to store the image data recorded on the recording medium of the digital camera in the external storage device or the storage device arranged in the information terminal device as backup data, the image data is expected to be erased from the recording medium in many cases.

However, in the conventional digital camera, it is very complicated to cancel a read-only attribute, which is set once, because the same troublesome procedure for setting protection described in FIGS. 15A to 15D and FIGS. 16A to 16C must be performed. Therefore, it is also complicated to erase image data, to which a read-only attribute is set, from a recording medium.

SUMMARY OF THE INVENTION

The present invention has been made in consideration of the above-mentioned circumstances, and its object is to provide a camera system, a digital camera, and a method for controlling a digital camera that can easily erase image data inhibited from being erased when the image data are backed up.

In order to achieve the above object, a camera system according to a first aspect of the invention comprises: a digital camera that includes a storage component for storing image data obtained by photographing; a transmission component for transmitting the stored image data in the storage component to an external system; an input component for inputting designation information for designating the image data to be inhibited from being erased from the storage component; and a setting component for setting inhibition of erasing of the image data in response to the designation information; and an external device that includes a reception component for receiving the image data transmitted by the transmission component; a backup storage component for storing the image data received by the reception component; and a control component for performing control such that the inhibition of erasing set to the image data is canceled when the image data stored in the backup storage component is image data to which the inhibition of erasing has been set.

According to the camera system of the first aspect, in the digital camera, image data obtained by photographing is stored in the storage component, and the image data stored in the storage component is transmitted to an external system by the transmission component. In this case, in the digital camera of the invention, designation information for designating the image data from the storage component to be inhibited from being erased is input by the input component as needed, and inhibition of erasing of the image data are set by the setting component depending on the designation information.

As the input component, any input device such as a keyboard, switches, a touch panel, and a tablet can be applied.

In the invention, in the external device, image data transmitted by the transmission component of the digital camera is received by the reception component, the received image data are stored in the backup storage component, and control is performed by the control component such that inhibition of erasing set to the image data is canceled when the image data stored in the backup storage component is image data to which the inhibition of erasing is set by the setting component.

The storage component and the backup storage component include storage elements such as a RAM (Random Access Memory), an EEPROM (Electrically Erasable and Programmable ROM), and a flash EEPROM, portable recording media such as a Smart Media, a Compact Flash, an ATA (AT Attachment) card, a floppy disk, a CD-R (Compact Disc-Recordable), a CD-RW (Compact Disc-Rewritable), and a photomagnetic disk, and fixed recording media such as a hard disk drive.

More specifically, in the invention, when image data stored in the storage component of the digital camera is backed up by the backup storage component of the external device, inhibition of erasing set to the image data is canceled. In this manner, the image data can be made easily erasable.

As described above, according to the camera system of the first aspect, in the digital camera, image data obtained by photographing is stored in the storage component, and the image data stored in the storage component is transmitted to an external system. In the external device, the image data transmitted from the digital camera is received, the received image data are stored in the backup storage component, and control is performed such that inhibition of erasing set to the image data is canceled when the image data stored in the backup storage component is image data to which the inhibition of erasing is set in the digital camera. For this reason, the image data inhibited from being erased can be made easily erasable when the image data are backed up.

The input component of the camera system of the first aspect further inputs count information indicating the number of times image data to be canceled in the backup storage component is stored as a condition of cancellation performed by the control component, the transmission component further transmits the count information to an external system, the reception component further receives the count information, and the control component may perform control such that inhibition of erasing set to the image data is canceled when the image data to be canceled is stored in the backup storage component the number of times indicated by the count information.

According to the camera system, in the digital camera, count information indicating the number of times of storage of image data to be canceled in the backup storage component is further input by the input component as a condition of cancel performed by the control component, and the count information is further transmitted by the transmission component to an external system. In the external device, the count information is further received by the reception component, and control is performed by the control component such that inhibition of erasing set to the image data is canceled when the image data to be canceled is stored in the backup storage component the number of times indicated by the count information.

More specifically, inhibition of erasing set to the image data is canceled only when the image data transmitted from the digital camera is stored (backed up) in the backup storage component the number of times indicated by the count information in the external device. In this manner, the number of times of backup of the image data, which inhibition of erasing has been canceled, can be made plural, and the risk that backup data of the image data are erased can be reduced.

As described above, according to this camera system, the same effect as that of the camera system described above can be achieved, count information indicating the number of times of storage of image data to be canceled in the backup storage component is further input as a condition of cancel of erasing inhibition by the digital camera, and control is performed by the external device such that inhibition of erasing set to the image data is canceled when the image data to be canceled is stored in the backup storage component the number of times indicated by the count information. Therefore, the risk that backup data of image data are erased can be reduced.

The control component of the camera system according to the first aspect may perform control to erase the image data stored in the backup storage component from the storage component.

According to this camera system, control is performed by the control component of the external device such that the image data stored in the backup storage component is erased from the storage component of the digital camera.

More specifically, when the image data stored in the storage component of the digital camera is stored (backed up) by the backup storage component of the external device, the image data are erased from the storage component of the digital camera. In this manner, the user of the digital camera can be avoided trouble of erasing the image data, which is backed up from the storage component.

As described above, according to the camera system, control is performed such that the image data stored in the backup storage component is erased from the storage component of the digital camera by the external device. For this reason, the trouble of erasing the image data, which is backed up from the storage component, can be avoided.

The input component of the camera system according to the first aspect further inputs count information indicating the number of times image data to be canceled in the backup storage component is stored as a condition of erasing performed by the control component, the transmission component further transmits the count information to an external system, the reception component further receives the count information, and the control component may perform control such that the image data are erased from the storage component when the image data to be erased is stored in the backup storage component the number of times indicated by the count information.

According to this camera system, in the digital camera, count information indicating the number of times of storage of image data to be canceled in the backup storage component is further input by the input component as a condition of erasing performed by the control component, and the count information is further transmitted by the transmission component to an external system. In the external device, the count information is further received by the reception component, and control is performed by the control component such that the image data are erased from the storage component of the digital camera when the image data to be erased is stored in the backup storage component the number of times indicated by the count information.

More specifically, the image data are erased from the storage component of the digital camera only when the image data transmitted from the digital camera is stored (backed up) in the backup storage component the number of times indicated by the count information in the external device. In this manner, the number of times of backup of the image data erased from the storage component can be made plural, and the risk that backup data of the image data are erased can be reduced.

As described above, according to this camera system, the same effect as that of the camera system described above can be achieved, count information indicating the number of times of storage of image data to be erased in the backup storage component is further input as a condition of erasing from the storage component by the digital camera, and control is performed by the external device such that the image data are erased from the storage component of the digital camera when the image data to be erased is stored in the backup storage component the number of times indicated by the count information. For this reason, the risk that backup data of the image data are erased can be reduced.

The designation information preferably designates image data obtained by the subsequent photographing to be inhibited from being erased. In this manner, the trouble of setting inhibition of erasing every photographing can be avoided, and the setting can be prevented from being forgotten when inhibition of erasing is set for respective pieces of image data at once upon completion of the photographing.

The input component of the camera system according to the first aspect further inputs erasing inhibition information indicating whether image data transmitted by the transmission component is inhibited from being erased or not, the transmission component further transmits the erasing inhibition information to an external system, the reception component further receives the erasing inhibition information, and the control component may perform control such that inhibition of erasing of the image data from the backup storage component is set when the erasing inhibition information indicates that erasing is inhibited.

According to this camera system, in the digital camera, the erasing inhibition information indicating whether the image data transmitted by the transmission component is inhibited from being erased or not is further input by the input component, and the erasing inhibition information is further transmitted to an external system by the transmission component.

In the external device, the erasing inhibition information is further received by the reception component, and control is performed by the control component such that inhibition of erasing of the image data from the backup storage component is set when the erasing inhibition information indicates that erasing is inhibited.

More specifically, when the erasing inhibition information, which is input into the digital camera and which indicates whether the image data transmitted to the external device is inhibited from being erased or not, indicates that erasing is inhibited, the image data are inhibited from being erased from the backup storage component, so that backup data can be protected.

As described above, according to this camera system, the same effect as that of the camera system described above can be achieved, and erasing inhibition information indicating whether image data to be transmitted is inhibited from being erased or not is input by the digital camera, and control is performed by the external device such that inhibition of erasing of the image data from the backup storage component is set when the erasing inhibition information indicates that erasing is inhibited. Therefore, the backup data can be protected.

A digital camera according to the second aspect of the invention comprises: a storage component for storing image data obtained by photographing; an input component for inputting designation information that designates the image data to be inhibited from being erased from the storage component; a setting component for setting inhibition of erasing of the image data in accordance with the designation information; an external storage component for storing image data stored in the storage component in an external storage device; and a control component for performing control such that inhibition of erasing set to the image data is canceled when the image data stored in the external storage device by the external storage component is image data to which the inhibition of erasing is set.

According to this digital camera, image data obtained by photographing is stored in the storage component.

In the invention, designation information for designating the image data from the storage component to be inhibited from being erased is input by the input component as needed, and inhibition of erasing of the image data are set by the setting component depending on the designation information.

As the input component, any input device such as a keyboard, switches, a touch panel, and a tablet can be applied.

On the other hand, in the invention, the image data stored in the storage component is stored in the external storage device by the external storage component, and control is performed such that the inhibition of erasing set to the image data is canceled when the image data stored in the external storage device is image data to which the inhibition of erasing is set by the setting component.

The storage component includes a storage element such as a RAM, an EEPROM, and a flash EEPROM, a portable recording medium such as a Smart Media, a Compact Flash, an ATA card, a floppy disk, a CD-R, a CD-RW, a photomagnetic disk, and a fixed recording medium such as a hard disk drive. As the external storage device, a device uses a storage element such as a RAM, an EEPROM, and a flash EEPROM as a storage medium, or a device that uses a portable recording medium such as a Smart Media, a Compact Flash, an ATA card, a floppy disk, a CD-R, a CD-RW, and a photomagnetic disk and a fixed recording medium such as a hard disk drive, or the like can be applied.

More specifically, in the invention, when image data stored in the storage component is backed up by the external storage device, inhibition of erasing set to the image data is canceled. In this manner, the image data can be made easily erasable.

As described above, according to the digital camera, image data obtained by photographing is stored in the storage component, the image data stored in the storage component is stored in the external storage device, and control is performed such that inhibition of erasing set to the image data is canceled when the image data stored in the external storage device is image data to which the inhibition of erasing is set. For this reason, the image data inhibited from being erased can be made easily erasable when the image data are backed up.

The input component of the digital camera of the second aspect further inputs count information indicating the number of times image data to be canceled in the external storage device was stored as a condition of cancellation performed by the control component, and the control component may perform control such that inhibition of erasing set to the image data is canceled when the image data to be canceled is stored in the external storage device the number of times indicated by the count information.

According to the digital camera, count information indicating the number of times of storage of image data to be canceled in the external storage device is further input by the input component as a condition of cancel performed by the control component, and control is performed by the control component such that inhibition of erasing set to the image data is canceled when the image data to be canceled is stored in the external storage device the number of times indicated by the count information.

More specifically, inhibition of erasing set to the image data is canceled only when the image data stored in the storage component is stored (backed up) in the external storage device the number of times indicated by the count information. In this manner, the number of times of backup of the image data the inhibition of erasing of which is canceled can be made plural, and the risk that backup data of the image data are erased can be reduced.

As described above, according to this digital camera, the same effect as that of the camera system described above can be achieved, count information indicating the number of times of storage of image data to be canceled in the external storage device is input as a condition of cancel of erasing inhibition, and control is performed such that inhibition of erasing set to the image data is canceled when the image data to be canceled is stored in the external storage device the number of times indicated by the count information. For this reason, the risk of backup data of the image data being erased can be reduced.

The control component of the digital camera controls erasure of the image data from the storage component stored in the external storage device.

According to this camera system, control is performed by the control component such that the image data stored in the external storage device is erased from the storage component.

More specifically, when the image data stored in the storage component is stored (backed up) by the external storage device, the image data are erased from the storage component. In this manner, the trouble of erasing the image data, which is backed up from the storage component can be avoided by a user.

In this manner, according to this digital camera, control is performed such that the image data stored in the external storage device is erased from the storage component. For this reason, the trouble of erasing the image data, which is backed up from the storage component, can be avoided.

The input component of the digital camera further inputs count information indicating the number of times image data to be erased in the external storage device was stored as a condition of erasing performed by the control component, and the control component may perform control such that the image data are erased from the storage component when the image data to be erased is stored in the external storage device the number of times indicated by the count information.

According to the digital camera, count information indicating the number of times of storage of image data to be erased in the external storage device is further input by the input component as a condition of erasing performed by the control component, and control is performed by the control component such that the image data are erased from the storage component when the image data to be erased is stored in the external storage device the number of times indicated by the count information.

More specifically, the image data are erased from the storage component only when the image data stored in the storage component is stored (backed up) in the external storage device the number of times indicated by the count information. In this manner, the number of times of backup of the image data, which is erased from the storage component, can be made plural, and the risk that backup data of the image data are erased can be reduced.

As described above, according to this digital camera, the same effect as that of the digital camera described above can be achieved, count information indicating the number of times of storage of image data to be erased in the external storage device is input as a condition of erasing from the storage component, and control is performed such that the image data are erased from the storage component when the image data to be erased is stored in the external storage device the number of times indicated by the count information. For this reason, the risk that backup data of the image data are erased can be reduced.

The designation information preferably designates image data obtained by the subsequent photographing to be inhibited from being erased. In this manner, the trouble of setting inhibition of erasing every photographing can be avoided, and the setting can be prevented from being forgotten when inhibition of erasing is set for respective pieces of image data at once upon completion of the photographing.

The input component of the digital camera further inputs erasing inhibition information indicating whether image data stored by the external storage device is inhibited from being erased from the external storage device or not, and the control component may perform control such that inhibition of erasing of the image data from the external storage device is set when the erasing inhibition information indicates that erasing is inhibited.

According to the digital camera, the erasing inhibition information indicating whether the image data stored in the external storage device is inhibited from being erased from the external storage device or not is further input by the input component, and control is performed such that inhibition of erasing of the image data from the external storage device is set when the erasing inhibition information indicates that the image data are inhibited from being erased from the external storage device.

More specifically, the image data are inhibited from being erased from the external storage device when an instruction for designating the image data stored in the external storage device to be inhibited from being erased is input. In this manner, the backup data can be protected.

As described above, according to this digital camera, the same effect as that of the digital camera described above can be achieved, and erasing inhibition information indicating whether image data to be stored in the external storage device is inhibited from being erased or not is input, and control is performed such that inhibition of erasing of the image data from the external storage device is set when the erasing inhibition information indicates that the image data are inhibited from erased from the external storage device. For this reason, the backup data can be protected.

A method for controlling a digital camera according to the third aspect of the invention, the digital camera including a storage component for storing image data obtained by photographing, wherein the image data stored in the storage component is stored in an external storage device, and control is performed such that, when the image data are image data to which inhibition of erasing from the storage component is set, the inhibition of erasing is canceled.

The storage component includes a storage element such as a RAM, an EEPROM, and a flash EEPROM, a portable recording medium such as a Smart Media, a Compact Flash, an ATA card, a floppy disk, a CD-R, a CD-RW, and a photomagnetic disk, and a fixed recording medium such as a hard disk drive. As the external storage device, a device that uses a storage element such as a RAM, an EEPROM, and a flash EEPROM as a storage medium, or a device that uses a portable recording medium such as a Smart Media, a Compact Flash, an ATA card, a floppy disk, a CD-R, a CD-RW, a photomagnetic disk, and a fixed recording medium such as a hard disk drive as a recording medium, or the like can be applied.

More specifically, when image data stored in the storage component is backed up by the external storage device, inhibition of erasing set to the image data is canceled. In this manner, the image data can be made easily erasable.

As described above, according to the method for controlling a digital camera, image data obtained by photographing and stored in the storage component is stored in the storage device, and control is performed such that inhibition of erasing set to the image data is canceled when the image data are image data to which the inhibition of erasing from the storage component is set. For this reason, the image data inhibited from being erased can be made easily erasable when the image data are backed up.

A method for controlling a digital camera according to a fourth aspect is a method for controlling a digital camera including a storage component for storing image data obtained by photographing, wherein the image data stored in the storage component is stored in an external storage device, and control is performed such that the image data are erased from the storage component.

The storage component includes a storage element such as a RAM, an EEPROM, and a flash EEPROM, a portable recording medium such as a Smart Media, a Compact Flash, an ATA card, a floppy disk, a CD-R, a CD-RW, and a photomagnetic disk, and a fixed recording medium such as a hard disk drive. As the external storage device, a device that uses a storage element such as a RAM, an EEPROM, and a flash EEPROM as a storage medium, or a device that uses a portable recording medium such as a Smart Media, a Compact Flash, an ATA card, a floppy disk, a CD-R, a CD-RW, and a photomagnetic disk and a fixed recording medium such as a hard disk drive as a recording medium, or the like can be applied.

More specifically, when the image data stored in the storage component is backed up by the external storage device, the image data are erased from the storage component. In this manner, the user's trouble of erasing the image data, which is backed up from the storage component, can be reduced.

As described above, according to the method for controlling a digital camera according to the fourth aspect, since control is performed such that the image data stored (backed up) in the external storage device is erased from the storage component, the trouble of erasing the image data which is backed up from the storage component can be avoided.

According to the camera system of the invention, in the digital camera, image data obtained by photographing is stored in the storage component, and the image data stored in the storage component is transmitted to an external system. In the external device, the image data transmitted from the digital camera is received, the received image data are stored in the backup storage component, and control is performed such that inhibition of erasing set to the image data is canceled when the image data stored in the backup storage component is image data to which the inhibition of erasing is set in the digital camera. For this reason, the image data inhibited from being erased can be made easily erasable when the image data are backed up, advantageously.

According to the digital camera of the invention, image data obtained by photographing is stored in the storage component, the image data stored in the storage component is stored in the external storage device, and control is performed such that inhibition of erasing set to the image data is canceled when the image data stored in the external storage device is image data to which the inhibition of erasing is set. For this reason, the image data inhibited from being erased can be made easily erasable when the image data are backed up, advantageously.

According to the method for controlling a digital camera, image data obtained by photographing and stored in the storage component is stored in the external storage device, and control is performed such that inhibition of erasing set to the image data is canceled when the image data are image data to which the inhibition of erasing from the storage component is set. For this reason, the image data inhibited from being erased can be made easily erasable when the image data are backed up, advantageously.

Furthermore, according to the other method for controlling a digital camera, since control is performed such that image data stored (backed up) in the external storage device is erased from the storage component, the trouble of erasing the image data which is backed up from the storage component can be avoided, advantageously.

DETAILED DESCRIPTION OF THE PREFERRED EMBODIMENTS

Embodiments of the present invention will be described below with reference to the accompanying drawings.

First Embodiment

In the first embodiment, a configuration of a camera system will be described. A configuration in appearance of a digital camera 10 according to this embodiment will be described below with reference to FIG. 1A and FIG. 1B.

Figure 1A:
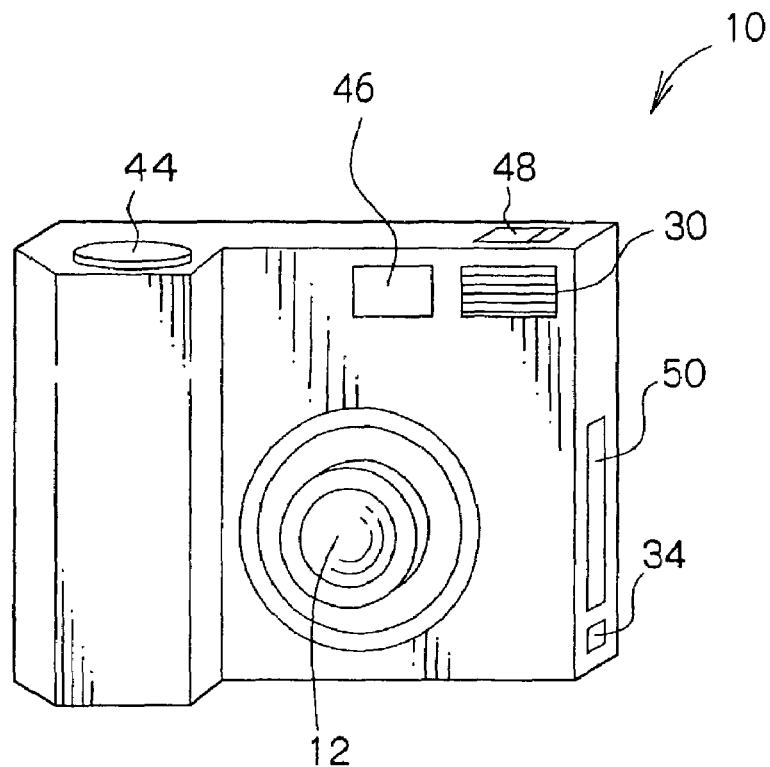
FIG. 1A is a front view showing a configuration in appearance of a digital camera according to the first to third embodiments of the present invention.

As shown in FIG. 1A, a lens 12 for forming an object image, an electric flash unit 30 which emits light when a low illumination intensity at which an object cannot obtain an appropriate light intensity in exposure is set, and an optical view finder 46 used to define a picture composition of the object to be photographed are arranged on the front surface of the digital camera 10.

On the upper surface of the digital camera 10, a shutter switch (so-called release switch) 44 depressed by a user when photographing is executed, and a power switch 48 are arranged. On a side surface of the digital camera 10, a digital interface (to be referred to as a "digital I/F" hereinafter) 34, connected to an external device, for controlling communication in a predetermined interface standard (in this embodiment, USB (Universal Serious Bus)) between the digital camera and the external device, and a recording media insertion port 50 into which, when a portable recording medium (in this embodiment, a memory card) for storing image data obtained by photographing is loaded on the digital camera 10, the recording medium is inserted are arranged.

Figure 1B:
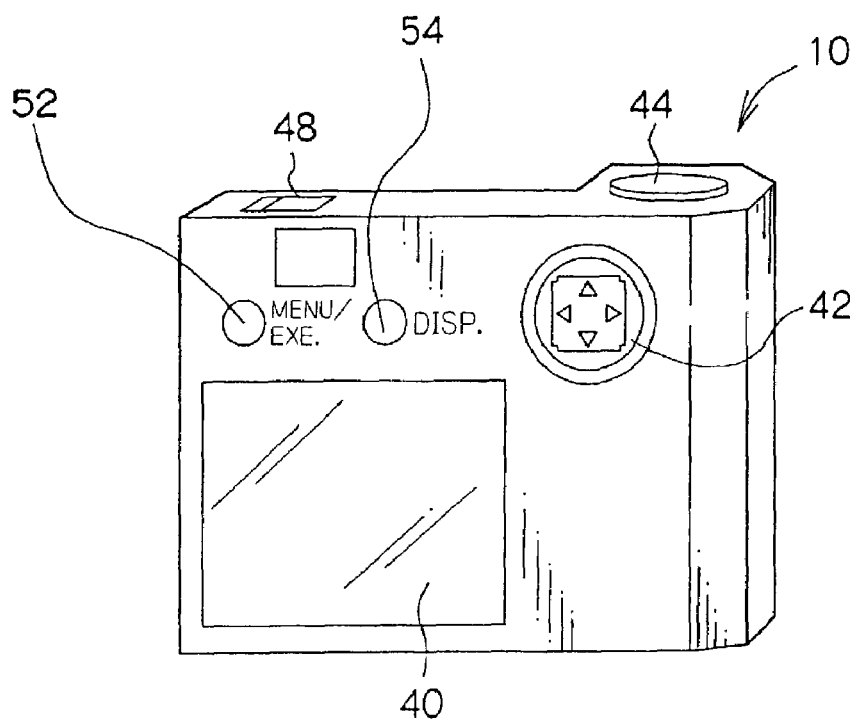
FIG. 1B is a rear view showing a configuration in appearance of the digital camera according to the first to third embodiments of the present invention.

On the other hand, as shown in FIG. 1B, on the rear surface of the digital camera 10, an image monitor 40 constituted by a liquid crystal display for displaying an object image obtained by photographing, various menus, a message, or the like, an operation switch 42 on which an arrow key indicating four upper, lower, left, and right moving directions in a display area of the image monitor 40, a menu/execution switch 52 depressed when a menu is displayed and a set process is executed, and a display switch 54 depressed when the photographed object image is displayed on the image monitor 40 are arranged.

The configuration of an electric system of the digital camera 10 according to this embodiment will be described below with reference to FIG. 2.

Figure 2:
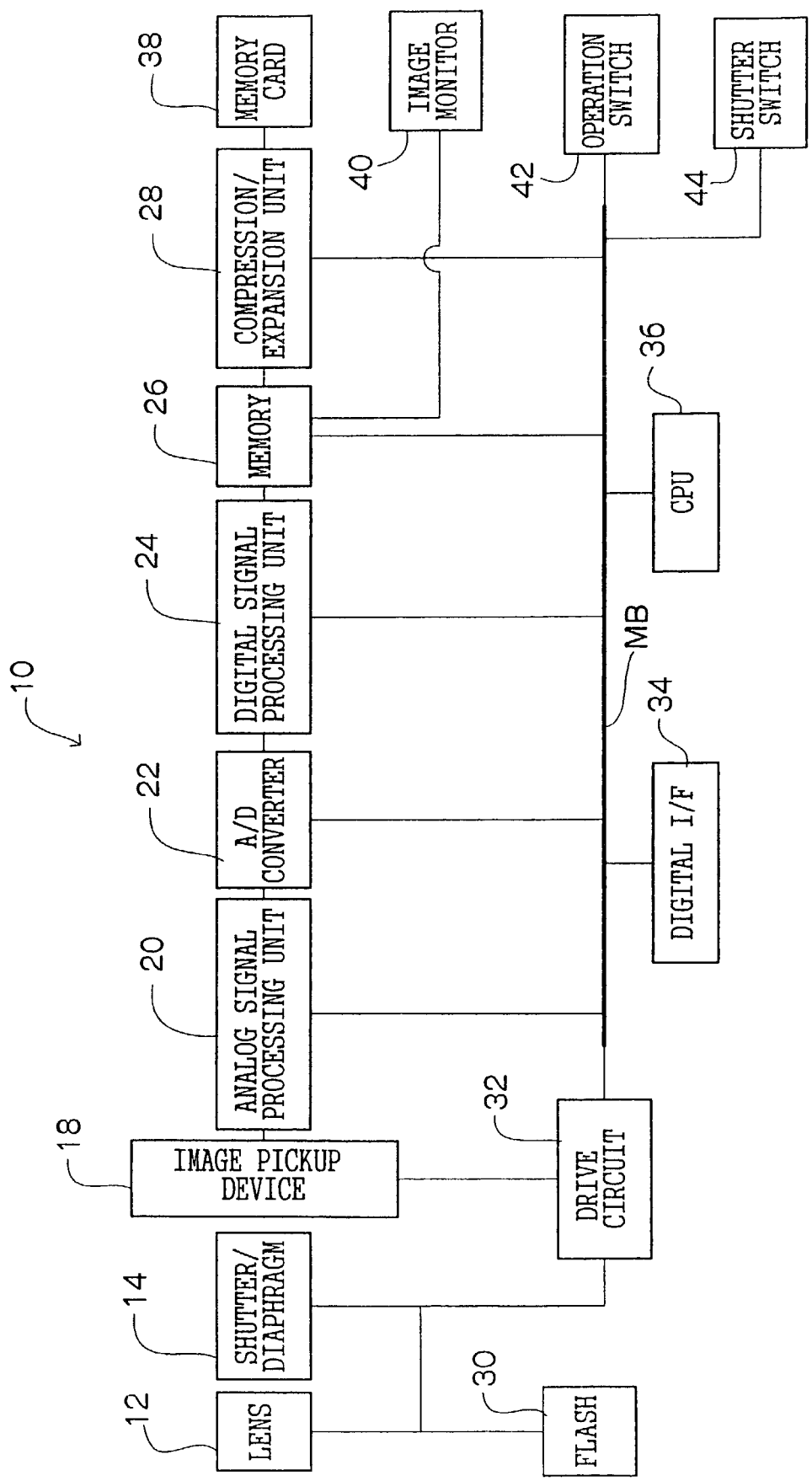
FIG. 2 is a block diagram showing the configuration of an electric system of the digital camera according to the first to third embodiments of the present invention.

As shown in FIG. 2, the digital camera 10 comprises a mechanical shutter and diaphragm (to be referred to as "shutter/diaphragm" hereinafter) 14 for regulating a light intensity of incident light passing through a lens 12 and indicating an object in photographing, an image pickup device 18 constituted by a CCD for picking up an image of the object on the basis of the incident light to output an analog image signal indicating the object image, an analog signal processing unit 20 for performing a predetermined signal process to an input signal, an analog-to-digital converter (to be referred to as an "A/D converter" hereinafter) 22 for converting the input analog signal into a digital signal, a digital signal processing unit 24 for performing a predetermined digital signal process to the input digital signal, a memory 26 constituted by an SDRAM (Synchronous Dynamic Random Access Memory) for storing information mainly indicated by the input digital signal, a compression/expansion unit 28 for compressing the input digital data in a compression format (in this embodiment, the JPEG (Joint Photographic Experts Group) format) or expanding the digital data using an expansion method depending on the compression format, and a drive circuit 32 for generating drive signals for driving the lens 12, the shutter/diaphragm 14, the image pickup device 18, and the electric flash unit 30.

The output terminal of the image pickup device 18 is connected to the input terminal of the analog signal processing unit 20, and the output terminal of the analog signal processing unit 20 is connected to the input terminal of the A/D converter 22, the output terminal of the A/D converter 22 is connected to the input terminal of the digital signal processing unit 24, and the output terminal of the digital signal processing unit 24 is connected to the input terminal of the memory 26. An analog image signal obtained by image pickup performed by the image pickup device 18 is subjected to a predetermined signal process by the analog signal processing unit 20 and converted into a digital signal by the A/D converter 22. The digital signal is subjected to a predetermined digital signal process by the digital signal processing unit 24 and temporarily stored in the memory 26 as digital image data.

The predetermined analog signal process performed by the analog signal processing unit 20 according to this embodiment includes a correlated double sampling process and a γ (gamma) correction process. In this case, it is known that the correlated double sampling process takes an effect in, especially, a reduction in thermal noise for a signal to be processed and that an S/N ratio (Signal to Noise Ratio) can be improved.

The predetermined digital signal process performed in the digital signal processing unit 24 according to this embodiment includes a high-frequency signal process and an interpolation process. In the high-frequency signal process, from a signal to be processed, for example, a frequency band held by a luminance signal in a vertical direction/horizontal direction is extended by the $Y_H Y_L$ method in accordance with pixels to be higher than a normal frequency band, and the signal is processed such that frequency ranges in the vertical direction/horizontal direction do not overlap to increase the grade of the signal. The interpolation process is a process performed when a single-panel color separation filter is used in the image pickup device 18. The interpolation process generates two other colors of the color filter arranged at the position. When the interpolation process is performed, interpolation data of three primary colors R (red), G (green), and B (blue) are calculated by using the obtained high-frequency luminance signal. In this manner, plain data of three primary colors R, G, and B are obtained for respective pixels of a valid screen area of the image pickup device 18.

An output terminal for outputting various drive signals of the drive circuit 32 is connected to the lens 12, the shutter/diaphragm 14, the image pickup device 18, and the electric flash unit 30. These respective sections are driven by the drive signals input from the drive circuit 32. In FIG. 2, in order to make the illustration easy, a state in which one line is branched and connected from the drive circuit 32 to the lens 12, the shutter/diaphragm 14, and the electric flash unit 30 is shown. The drive circuit 32 is actually connected to the respective sections by different wires, and the sections are actually driven by different drive signals.

On the other hand, the digital camera 10 further comprises a CPU (Central Processing Unit) 36 for entirely controlling the digital camera 10.

The analog signal processing unit 20, the A/D converter 22, the digital signal processing unit 24, the memory 26, the compression/expansion unit 28, the drive circuit 32, the digital I/F 34, the CPU 36, the operation switch 42, and the shutter switch 44 are connected to a main bus MB. The CPU 36 can control the operations of the analog signal processing unit 20, the A/D converter 22, the digital signal processing unit 24, and the compression/expansion unit 28, access to an external device connected to the memory 26 and the digital I/F 34, and detection of operation states of the operation switch 42 and the shutter switch 44 by a user.

The output terminal of the memory 26 is connected to the memory card 38 inserted into and loaded on the recording media insertion port 50 through the compression/expansion unit 28, and digital image data stored in the memory 26 is compressed in a predetermined compression format by the compression/expansion unit 28 and the stored in the memory card 38 as an image file. The CPU 36 causes the compression/expansion unit 28 to expand the digital image data subjected to the compression process and stored in the memory card 38 and can read the digital image data through the memory 26. In addition, the other output terminal of the memory 26 is connected to the image monitor 40. The CPU 36 can display an object image indicated by the digital image data stored in the memory 26 on the image monitor 40, and can display various menus, messages, and the like on the image monitor 40 through the memory 26.

The menu/execution switch 52 and the display switch 54 are also connected to the main bus MB. The CPU 36 can detect operation states of these switches by a user.

On the other hand, the drive circuit 32 generates drive signals to be supplied to the lens 12, the shutter/diaphragm 14, the image pickup device 18, and the electric flash unit 30 based on a control signal depending on the photographing condition and input from the CPU 36, and supplies the drive signals to the respective sections. More specifically, the drive circuit 32 comprises a clock generation unit (not shown) and a timing signal generation unit (not shown), and generates drive signals to be supplied to the respective sections on the basis of a control signal input from the CPU 36 and various signals from the clock generation unit and the timing signal generation unit.

In the memory card 38 according to this embodiment, a text file (to be referred to as a "setting file" hereinafter) used for storing setting contents of various processes performed by a user as variable is stored in the memory card 38 according to this embodiment in advance.

In this case, variables stored as the setting file include a variable (to be referred to as an "auto-set variable" hereinafter) indicating whether an auto-set process (will be described later) is performed or not, a variable (to be referred to as an "automatic erasing variable" hereinafter) indicating whether an automatic erasing process (will be described later) is performed or not, a variable (to be referred to as a "backup count variable" hereinafter) indicating the number of times of backup (will be described later), and a variable (to be referred to as a "backup protection variable" hereinafter) indicating whether a backup protection process (will be described later) is performed or not. When a target process is performed, values indicating 'ON' ('1' in this embodiment) are set for the auto-set variable, the automatic erasing variable, and the backup protection variable. When the target process is not performed, values indicating 'OFF' ('0' in this embodiment) are set for these variables, and a variable indicating the number of times of backup is set for the backup count variable. The values '0' indicating 'OFF' are set for the auto-set variable, the automatic erasing variable, and the backup protection variable as defaults, and '1' is set for the backup count variable as a default.

Figure 3:
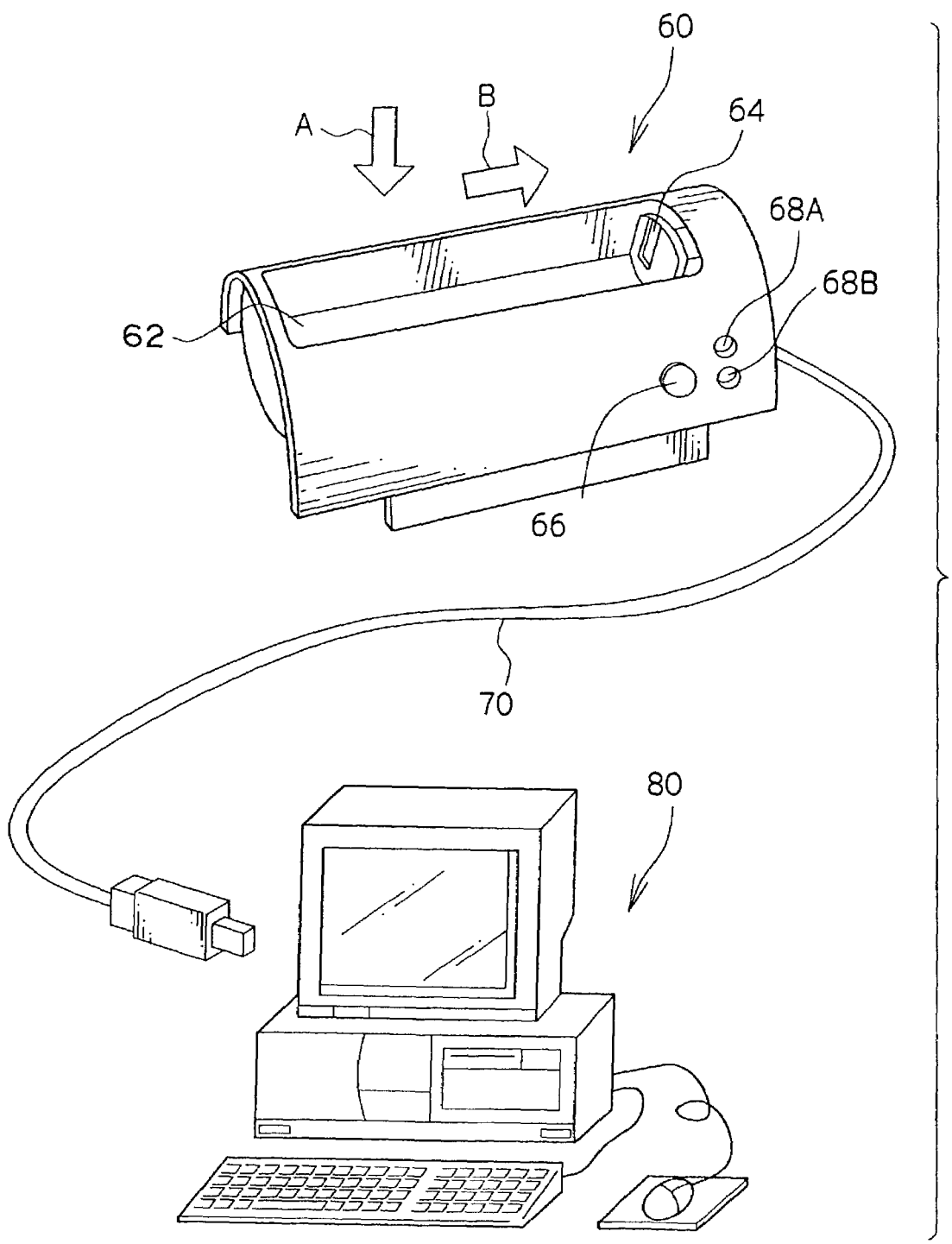
FIG. 3 is a perspective view showing the configuration of a cradle used to connect the digital camera to a personal computer, according to the first and second embodiments of the present invention.

On the other hand, FIG. 3 shows the configuration of a cradle 60 used for easily connecting the digital camera 10 to a personal computer 80. As shown in FIG. 3, a camera insertion unit 62 into which the digital camera 10 is inserted when the digital camera 10 is connected to the personal computer 80 through the cradle 60 is arranged on the cradle 60. In the camera insertion unit 62, a connection terminal 64 corresponding to the connection terminal of the digital I/F 34 arranged on the digital camera 10 is arranged.

When the digital camera 10 is loaded on the cradle 60, after the digital camera 10 is inserted in the direction of an arrow A in FIG. 3 such that the bottom surface of the digital camera 10 faces down, and the digital camera 10 is slid in the direction of an arrow B in FIG. 3. In this manner, the connection terminal of the digital I/F 34 of the digital camera 10 is connected to the connection terminal 64. The cradle 60 and the personal computer 80 are connected to each other by an interface cable (to be referred to as an "I/F cable" hereinafter) 70 which is connected in the predetermined standard (USB in this embodiment). Therefore, the digital camera 10 loaded on the cradle 60 can communicate with the personal computer 80 in the predetermined interface standard.

In addition, an automatic take-in button 66 which is depressed when an image file stored in the memory card 38 of the loaded digital camera 10 is taken into the personal computer 80, a charge/access lamp 68A which is turned on when a rechargeable battery of the loaded digital camera 10 is charged by power supplied from the personal computer 80 and when communication between the loaded digital camera 10 and the personal computer 80 is performed, and a power supply lamp 68B which is turned on when a power supply switch (not shown) is in an ON state are arranged on the cradle 60.

Figure 4:
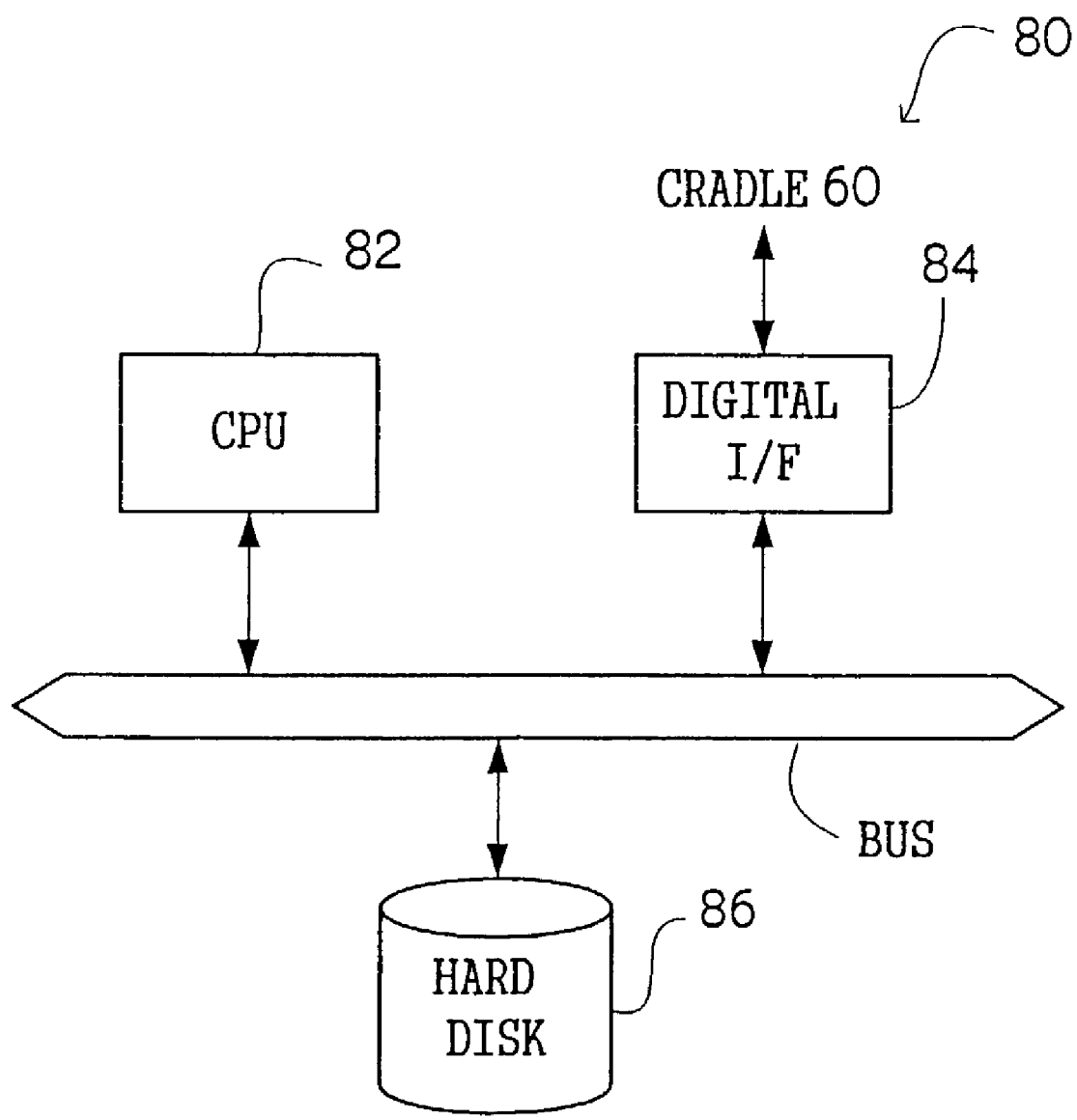
FIG. 4 is a block diagram showing the configuration of an electric system of a part especially related to the present invention in the personal computer according to the first and second embodiments of the present invention.

FIG. 4 shows the configuration of an electric system of a part especially related to the present invention in the personal computer 80. As shown in FIG. 4, the personal computer 80 includes such that a CPU 82 for entirely controlling the personal computer 80, a digital interface (to be referred to as a "digital I/F" hereinafter) 84 connected to an external device to control communication between the personal computer 80 and the external device in the predetermined interface standard (USB in this embodiment), and a hard disk 86 for storing information such as various programs and data, which are connected to each other through a bus Bus. Therefore, the CPU 82 can exchange the various information with the device connected through the digital I/F 84, write the various information in the hard disk 86, and read the various information written in the hard disk 86.

In this case, a connector of the other terminal of the I/F cable 70 in which a connector of one end is connected to the cradle 60 is connected to the digital I/F 84. Therefore, the CPU 82 of the personal computer 80 can exchange the various information with the digital camera 10 loaded on the cradle 60.

In the hard disk 86 according to this embodiment, a folder (to be referred to as a "backup filter" hereinafter) for storing reading and storing an image file stored in the device connected to the digital I/F 84 is arranged in advance, and a variable (to be referred to as an "actual backup count variable JN" hereinafter) indicating the number of times of storage every image file in the backup folder is stored as a file (to be referred to as an "actual backup count file" hereinafter) in the text format.

The memory card 38 loaded on the digital camera 10 corresponds to the storage component, the digital I/F 34 corresponds to the transmission component, the operation switch 42 corresponds to the input component, and the CPU 36 corresponds to the setting component. The digital I/F 84 arranged in the personal computer 80 corresponds to the reception component, the hard disk 86 corresponds to the backup storage component, and the CPU 82 corresponds to the control component.

Figure 5:
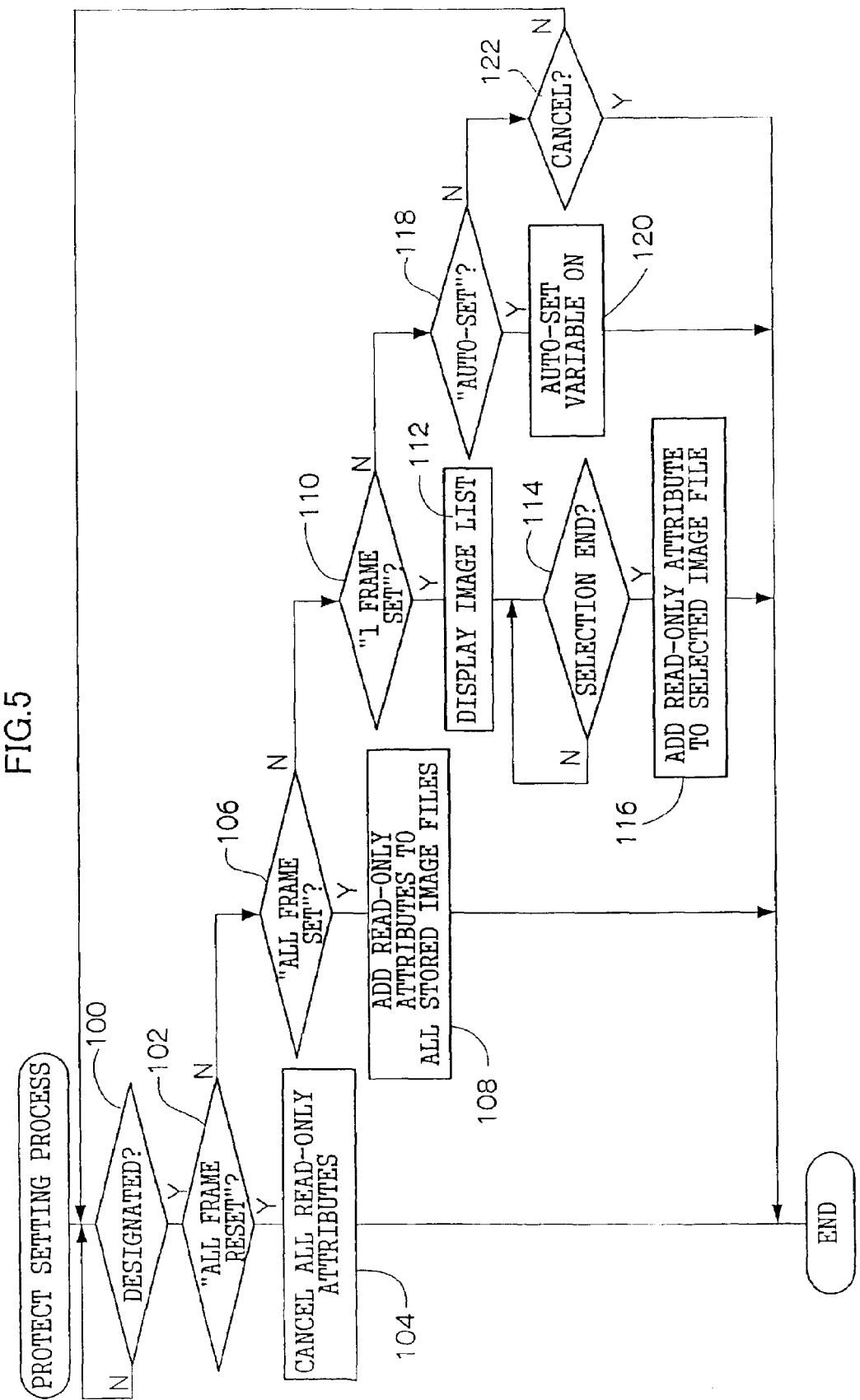
FIG. 5 is a flow chart showing a flow of processes of a protect setting process program in the first embodiment of the present invention.

An operation of a camera system according to this embodiment will be described below. A protect setting process executed in the digital camera 10 will be described below with reference to FIG. 5. FIG. 5 is a flow chart showing a flow of processes of the protect setting process program executed by the CPU 36 of the digital camera 10 when the protect setting process depending on a designation input by a user is executed.

Figure 6:
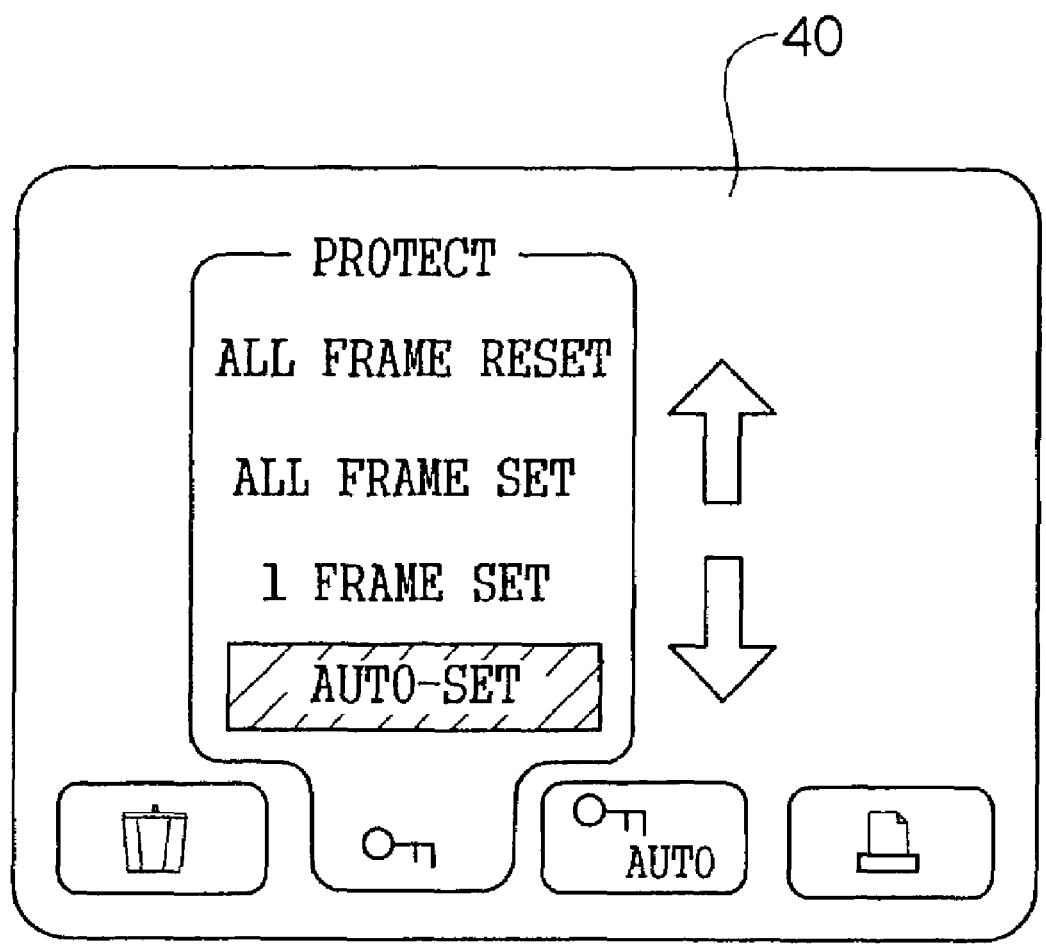
FIG. 6 is a schematic view showing a display of a protect menu according to the first to third embodiments of the present invention.

When the power switch 48 is in an ON state, and when a user depresses the menu/execution switch 52, the CPU 36 of the digital camera 10 displays a predetermined menu screen on the image monitor 40. The user selects a protect menu indicated by a key-shaped mark from the menu screen by operating the operation switch 42. In accordance with this, the CPU 36 displays the protect menu shown in FIG. 6 on the image monitor 40, and starts execution of the protect setting process program. When the protect menu is displayed on the image monitor 40, the user designates a desired process from the menu by operating the operation switch 42, or designates forced end (cancel) of the protect setting process by operating a cancel switch (not shown).

In "all frame reset" in the protect menu, a process of canceling all read-only attributes set to image files stored in the memory card 38 is performed. In "all frame set", a process of setting read-only attributes to all the image files stored in the memory card 38 is performed. In "1 frame set", a process of setting a read-only attribute to an image file of 1 frame selected in image data stored in the memory card 38 is performed. In "auto-set", a process of setting read-only attributes to all image files obtained by the subsequent photographing is performed.

In this manner, in the digital camera 10 according to this embodiment, as a method for setting inhibition of erasing of an image file stored in the memory card 38, a method for setting a read-only attribute to the image data are applied. To set a read-only attribute corresponds to "inhibition of erasing" in the invention. The read-only attribute is set to an FAT (File Allocation Table) stored in the memory card 38.

In step 100 of the protect setting process program (see FIG. 5), waiting for any one of designation of a desired process from the protect menu by a user and designation of cancel by using a cancel switch. In step 102, it is determined whether a process designated by the user is the "all frame reset" or not. When the determination is affirmed in step 102, the control flow shifts to step 104 to cancel all the read-only attributes set to the image files stored in the memory card 38, and this protect setting process program is ended.

On the other hand, when the determination is negated in step 102, the control flow shifts to step 106 to determine whether a process designated by the user is the "all frame set" or not. When the determination is affirmed in step 106, the control flow shifts to step 108, read-only attributes are set to all the image files stored in the memory card 38, and this protect setting process program is ended.

When the determination is negated in step 106, the control flow shift to step 110 to determine whether a process designated by the user is the "1 frame set" or not. When the determination is affirmed in step 110, the control flow shifts to step 112, all the image files stored in the memory card 38 are read while being expanded by the compression/expansion unit 28, and images (object images) indicated by the read image files are displayed on the image monitor 40 as thumbnails. When the thumbnails are displayed on the image monitor 40, the user designates an image to be protected from the thumbnails by operating the operation switch 42.

In the next step 114, the CPU waits for designation of a desired image by the user. In the next step 116, after a read-only attribute is set to an image file corresponding to the image designated by the user, the protect setting process program is ended.

When the determination is negated in step 110, the control flow shifts to step 118 to determine whether a process designated by the user is the "auto-set" or not. When the determination is affirmed in step 118, the control flow shifts to step 120, the value of an auto-set variable of a set file stored in the memory card 38 in advance is updated into a value ('1' in this embodiment) indicating 'ON'. Thereafter, the protect setting process program is ended.

When the determination is negated in step 118, the control flow shifts to step 122 to determine whether designated by the user is designation of cancel of the protect setting process by operating a cancel switch (not shown) or not. When the determination is affirmed in step 122, the protect setting process program is ended. When the determination is negated in step 122, it is considered that the contents of designation by the user have an error, and the control flow returns to step 100 without performing any process.

Figure 7:
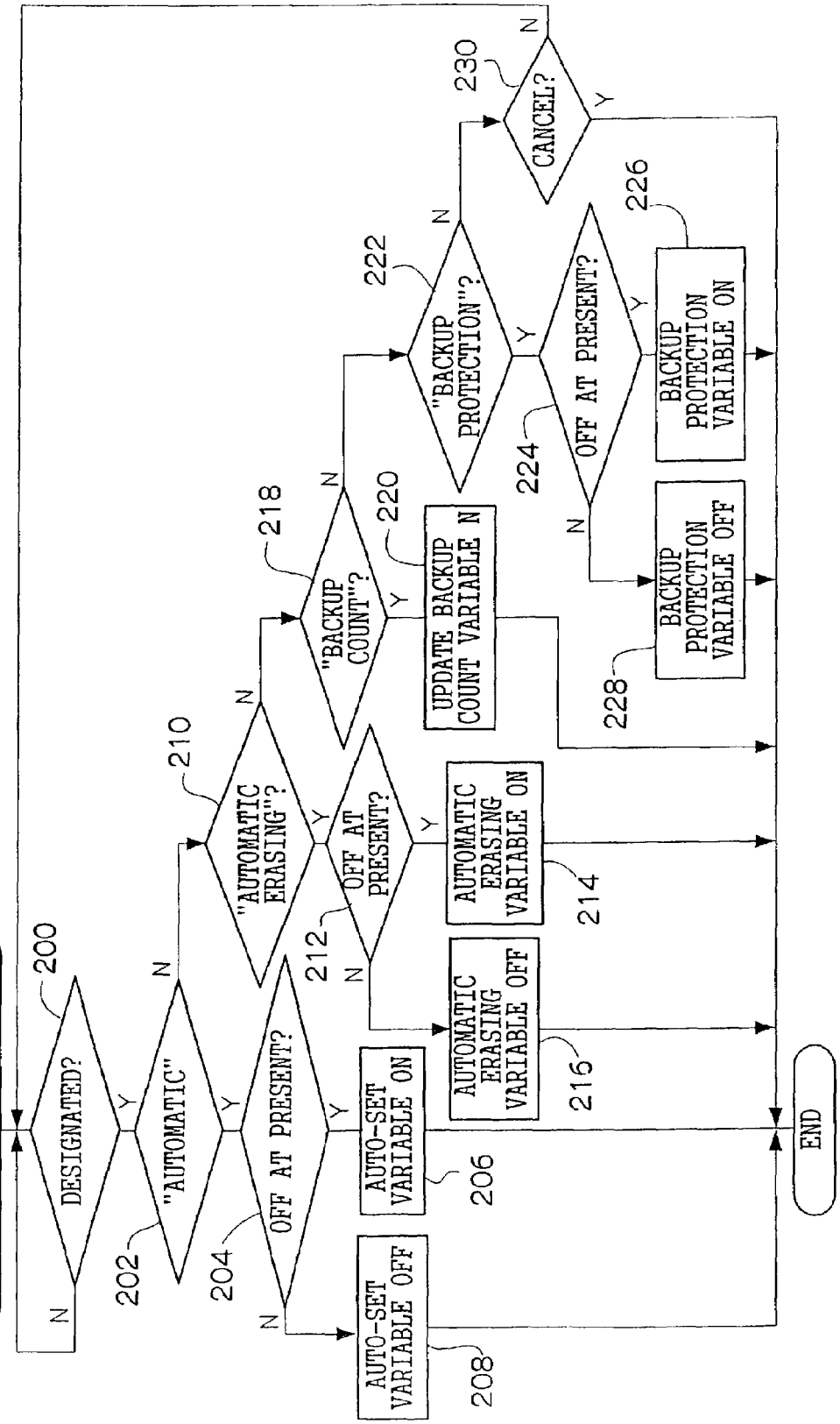
FIG. 7 is a flow chart showing a flow of processes of a protect automatic setting process program in the first embodiment of the present invention.

A protect auto-setting process executed in the digital camera 10 will be described below with reference to FIG. 7. FIG. 7 is a flow chart showing a flow of processes of the protect auto-setting process program executed by the CPU 36 of the digital camera 10 when the protect auto-setting process is performed in accordance with a designation input by a user.

Figure 8:
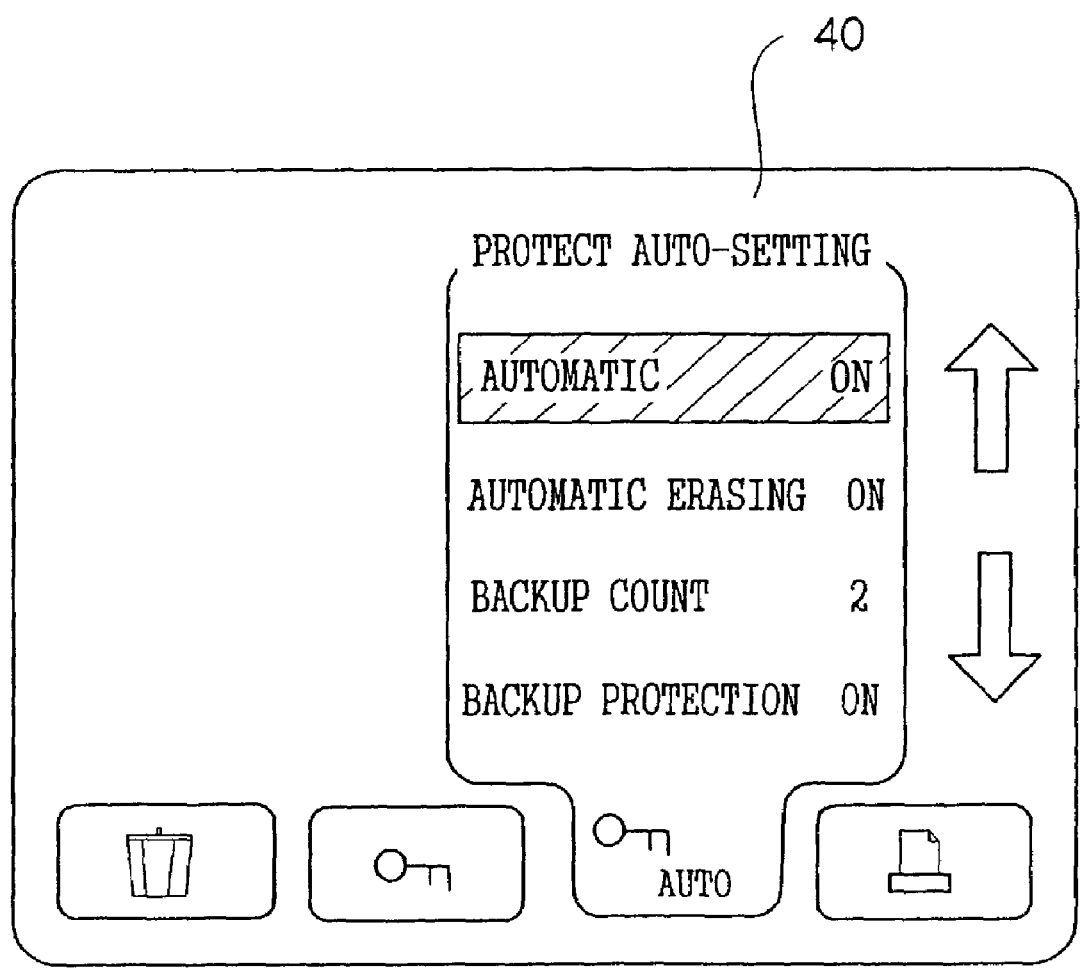
FIG. 8 is a schematic view showing a display of a protect automatic menu according to the first to third embodiments of the present invention.

When the power switch 48 is in an ON state, and when a user depresses the menu/execution switch 52, the CPU 36 of the digital camera 10 displays a predetermined menu screen on the image monitor 40. The user selects a protect auto-menu indicated by a key-shaped mark added with characters "AUTO" from the menu screen by operating the operation switch 42. In accordance with this, the CPU 36 displays the protect auto-menu shown in FIG. 8 on the image monitor 40, and starts execution of the protect auto-setting process program. When the protect auto-menu is displayed on the image monitor 40, the user designates a desired process from the menu by operating the operation switch 42, or designates forced end (cancel) of the protect auto-setting process by operating a cancel switch (not shown).

In "automatic" in the protect auto-menu, a process of setting read-only attributes to all image files obtained by the subsequent photographing is performed, i.e., the same process as that in the "auto-set" in the protect menu described above is performed.

In "automatic erasing" in the protect auto-menu, a process of automatically erasing an image file backed up by an external device from the memory card 38. In "backup count", a process of setting the number of times of backup of an image file to be erased as a condition of erasing of the image data are performed when "automatic erasing" is designated by the user. In "backup protection", a process of designating an image file backed up by an external device to be inhibited from being erased is performed.

In step 200 of the protect auto-setting process program (see FIG. 7), the CPU waits for any of designation of a desired process from the protect auto-menu by the user and designation of cancel by using the cancel switch. In the next step 202, it is determined whether the process designated by the user is the "automatic" or not. When the determination is affirmed in step 202, the control flow shifts to step 204 to determine whether the value of the auto-set variable of the setting file is a value indicating 'OFF' ('0' in this embodiment) or not. When the determination is affirmed in step 204, after the control flow shifts to step 206 to update the value of the auto-set variable into a value ('1' in this embodiment) indicating 'ON', the protect auto-setting process program. When the determination is negated in step 206, after the control flow shifts to step 208 to update the value of the auto-set variable into a value indicating 'OFF', and the protect auto-setting process program is ended. When the value of the auto-set variable indicates 'ON', 'ON is displayed at a position corresponding to the display "automatic" in the menu. When the value of the auto-set variable indicates 'OFF', 'OFF' is displayed at a position corresponding to the display "automatic" of the menu.

More specifically, in the processes in steps 204 to 208, when "automatic" is designated by a user, a setting for the auto-set variable at this time is inverted ('ON' when 'OFF' is set, and 'OFF' when 'ON' is set).

On the other hand, when the determination is negated in step 202, the control flow shifts to step 210 to determine whether a process designated by a user is "automatic erasing" or not. When the determination is affirmed in step 210, the control flow shifts to step 212 to determine whether the value of an automatic erasing variable of the setting file is a value ('0' in this embodiment) indicating 'OFF' or not. When the determination is affirmed in step 212, after the control flow shifts to step 214 to update the value of the automatic erasing variable into a value ('1' in this embodiment) indicating 'ON', the protect auto-setting process program is ended. When the determination is negated in step 212, after the control flow shifts to step 216 to update the value of the automatic erasing variable into a value indicating 'OFF', the protect auto-setting process program is ended. When the value of the automatic erasing variable indicates 'ON', 'ON' is displayed at a position corresponding to the display "automatic erasing" in the menu. When the value of the automatic erasing variable indicates 'OFF', 'OFF' is displayed at a position corresponding to the display "automatic erasing" of the menu.

More specifically, in the processes in steps 212 to 216, when "automatic erasing" is designated by a user, a setting for the automatic erasing variable at this time is inverted ('ON' when 'OFF' is set, and 'OFF' when 'ON' is set).

On the other hand, when the determination is negated in step 210, the control flow shifts to step 218 to determine whether a process designated by a user is "backup count" or not. When the determination is affirmed in step 218, after the control flow shifts to step 220 to update the value of a backup count variable N into a value depending on an operation of the operation switch 42 by a user, the protect auto-setting process program is ended. The value of the backup count variable N is incremented by only '1' by depressing a right-arrow key of the operation switch 42 once, and is decremented by '1' by depressing a left-arrow key of the operation switch 42 once.

When the determination is negated in step 218, the control flow shifts to step 222 to determine whether a process designated by a user is "backup protection" or not. When the determination is affirmed in step 222, the control,flow shifts to step 224 to determine whether the value of a backup protection variable of the setting file is a value ('0' in this embodiment) indicating 'OFF' or not. When the determination is affirmed in step 224, after the control flow shifts to step 226 to update the value of the backup protection variable into a value ('1' in this embodiment) indicating 'ON', the protect auto-setting process program is ended. When the determination is negated in step 224, after the control flow shifts to step 228 to update the value of the backup protection variable into a value indicating 'OFF', the protect auto-setting process program is ended. When the value of the backup protection variable indicates 'ON', 'ON is displayed at a position corresponding to the display "backup protection" in the menu. When the value of the backup protection variable indicates 'OFF', 'OFF' is displayed at a position corresponding to the display "backup protection" of the menu.

More specifically, in the processes in steps 224 to 228, when the "backup protection" is designated by a user, a setting for the backup protection variable at this time is inverted ('ON' when 'OFF' is set, and 'OFF' when 'ON' is set).

On the other hand, when the determination is negated in step 222, the control flow shifts to step 230 to determine whether cancel of the protect setting process by operating a cancel switch (not shown) by the user is designated or not. When the determination is affirmed in step 230, the protect auto-setting process program is ended. When the determination is negated in step 230, it is considered that the contents of designation by the user have an error, and the control flow returns to step 200 without performing any process.

The digital camera 10 determines whether the value of the auto-set variable of the setting file indicates ON or not every photographing. When the value indicates ON, an image file obtained by the photographing is stored in the memory card 38, and a read-only attribute is set in a storage area corresponding to the image file of the FAT of the memory card 38.

Figure 9:
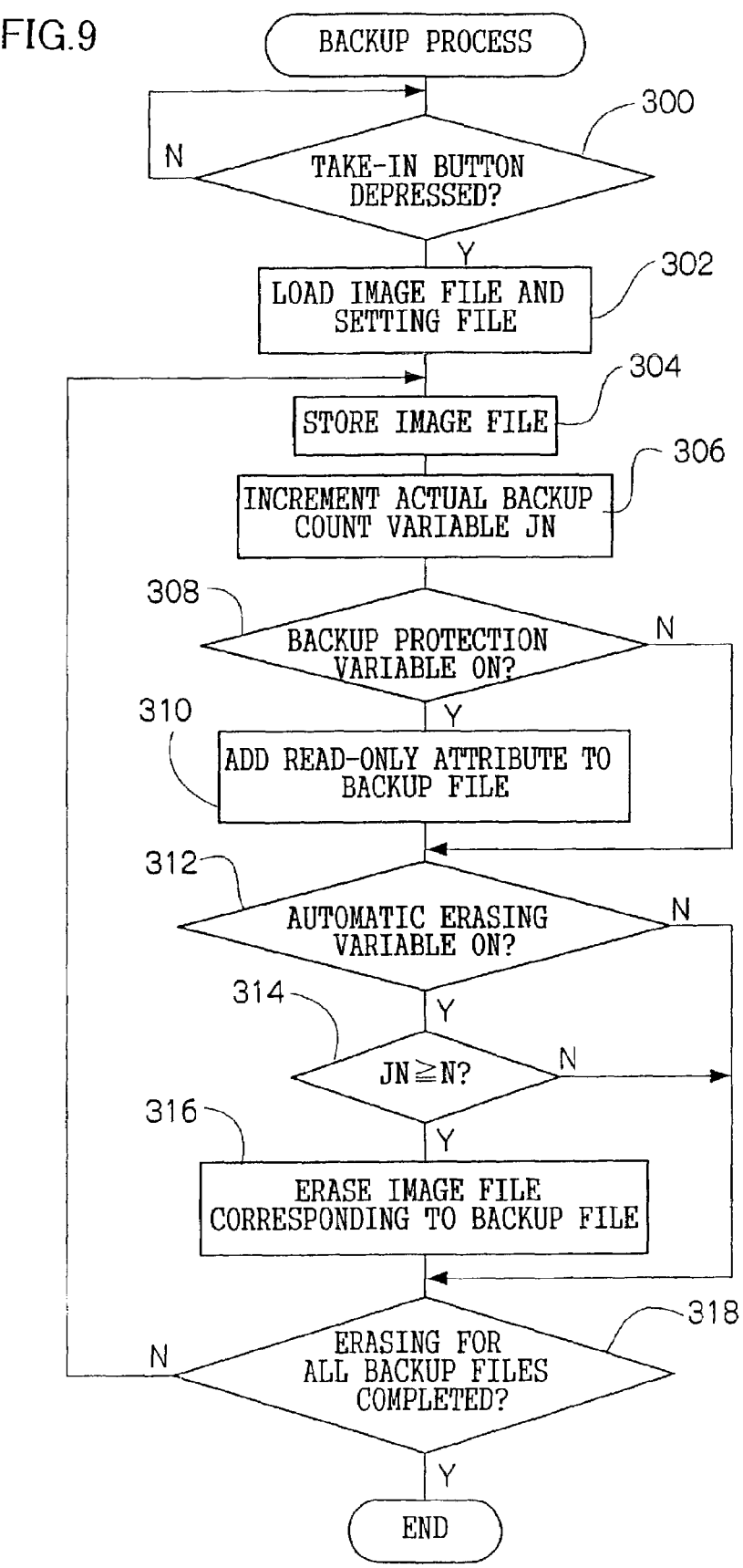
FIG. 9 is a flow chart showing a flow of processes of a backup process program in the first embodiment of the present invention.

A backup process executed in the personal computer 80 will be described below with reference to FIG. 9. FIG. 9 is a flow chart showing a flow of processes of a backup process program executed by the CPU 82 of the personal computer 80 when the digital camera 10 is loaded on the cradle 60 (see FIG. 3) and when the power switch 48 of the digital camera 10 is in an ON state. The program is stored in a predetermined region of the hard disk 86.

The digital camera 10 in which the power switch 48 is in an ON state on is loaded on the cradle 60, or the digital camera 10 in which the power switch 48 is in an OFF state is loaded on the cradle 60, and the power switch 48 is turned on. Thereafter, the user depresses the automatic take-in button 66 arranged on the cradle 60.

In step 300 in FIG. 9, the CPU waits for a depressing operation of the automatic take-in button 66 by the user. In step 302, all image files and setting files stored in the memory card 38 of the digital camera 10 loaded on the cradle 60 are read. In the next step 304, an image file, which is one file of the loaded image files is stored in a backup folder of the hard disk 86. When the image file having the same name as that of the stored image file exists in the backup folder, the image file is stored such that the extension of the file name is partially changed. When no image file having the same file name as that of the stored image file exists, '0' is stored in an actual backup count file of the hard disk 86 as the value of the actual backup count variable JN corresponding to the file name except for the extension of the image file.

In step 306, the actual backup count file is updated such that the value of the actual backup count variable JN corresponding to the image file stored in the backup folder in step 304 is incremented by only '1'. In the next step 308, it is determined whether the value of the backup protection variable in the setting file loaded in step 302 indicates 'ON' ('1' in this embodiment) or not. When the determination is affirmed in step 302, the control flow shifts to step 310, a read-only attribute of the image file stored in the backup folder in step 304 is added. Thereafter, the control flow shifts to step 312. Note that the read-only attribute is added to the FAT set on the hard disk 86.

On the other hand, the determination is negated in step 308, the control flow shifts to step 312 without executing the process in step 310.

In step 312, it is determined whether the value of an automatic erasing variable in the setting file loaded in step 302 indicates 'ON' ('0' in this embodiment) or not. When the determination is affirmed in step 312, the control flow shifts to step 314 to determine whether the value of the actual backup count variable JN corresponding to the image file stored in the backup folder in step 304 is equal or larger than the value of the backup count variable N or not. When the determination is affirmed in step 304, the control flow shifts to step 316, after the image file is erased from the memory card 38 of the digital camera 10, the control flow shifts to step 318.

On the other hand, when the determination is negated in step 312, and when the determination is negated in step 314, the control flow shifts to step 318 without executing the process in step 316.

In step 318, it is determined whether the processes in steps 304 to 316 are finished for all the image files loaded from the memory card 38 of the digital camera 10 in step 302. When the determination is negated in step 318, the control flow returns to step 304. When the determination is affirmed in step 318, the backup process program is ended. When the processes in steps 304 to 318 are repeated, these processes are performed to an image file, which has not been processed.

As described above in detail, in the camera system according to this embodiment, the digital camera 10 stores image data obtained by photographing in the memory card 38 and transmits the image data stored in the memory card 38 to an external system, and the personal computer 80 receives the image data transmitted from the digital camera 10, stores (backs up) the received data in the hard disk 86, and performs control such that the image data stored in the hard disk 86 is erased from the memory card 38. For this reason, the trouble of erasing the image data, which is backed up from the memory card 38, can be avoided.

In the camera system according to this embodiment, the digital camera 10 inputs count information (in this embodiment, the value of the backup count variable N) indicating the number of times of storage of image data to be erased in the hard disk 86 as a condition of erasing from the memory card 38, and the personal computer 80 performs control such that the image data are erased from the memory card 38 of the digital camera 10 when the image data to be erased is stored in the hard disk 86 the number of times indicated by the count information. For this reason, the risk that backup data of the image data are erased can be reduced.

In the camera system according to this embodiment, as designation information of the invention, information (in this embodiment, the value of an auto-set variable) which designates inhibition (in this embodiment, setting of a read-only attribute) of erasing of image data obtained by the subsequent photographing is applied. For this reason, the trouble of setting inhibition of erasing every photographing can be avoided, and the setting can be prevented from being forgotten when inhibition of erasing is set for respective pieces of image data at once upon completion of the photographing.

In addition, in the camera system according to this embodiment, the digital camera 10 inputs erasing inhibition information (in this embodiment, the value of a backup protection variable) indicating whether image data to be transmitted is inhibited from being erased or not, and the personal computer 80 performs control such that the inhibition of erasing of the image data from the hard disk 86 is set when the erasing inhibition information indicates inhibition of erasing. For this reason, the backup data can be protected.

Second Embodiment

The first embodiment describes a configuration obtained in a case in which an image file backed up by the personal computer 80 the number of times set as a backup count variable is erased from the memory card 38 of the digital camera 10. The second embodiment will describe a configuration obtained in a case in which, when a read-only attribute is set to the memory card 38 for an image file backed up by the personal computer 80 the number of times set as a backup count variable, the read-only attribute is canceled.

Since the configuration of the camera system in this case is the same as that of the camera system described in the first embodiment, a description thereof will be omitted. The first embodiment is different from the second embodiment in that a setting file according to the second embodiment includes, in place of an automatic erasing variable, a variable (to be referred to an "automatic cancel variable" hereinafter) indicating whether an automatic canceling process (will be described later) is performed or not. In this case, as the automatic cancel variable, a value indicating 'ON' ('1' in this embodiment) is set when the automatic canceling process is performed, and a value indicating 'OFF' ('0' in this embodiment) is set when the automatic canceling process is not performed.

An operation of the camera system according to the second embodiment will be described below. In the camera system according to the second embodiment, although the same protect setting process as that of the first embodiment is executed, the process will be omitted in this description.

Figure 10:
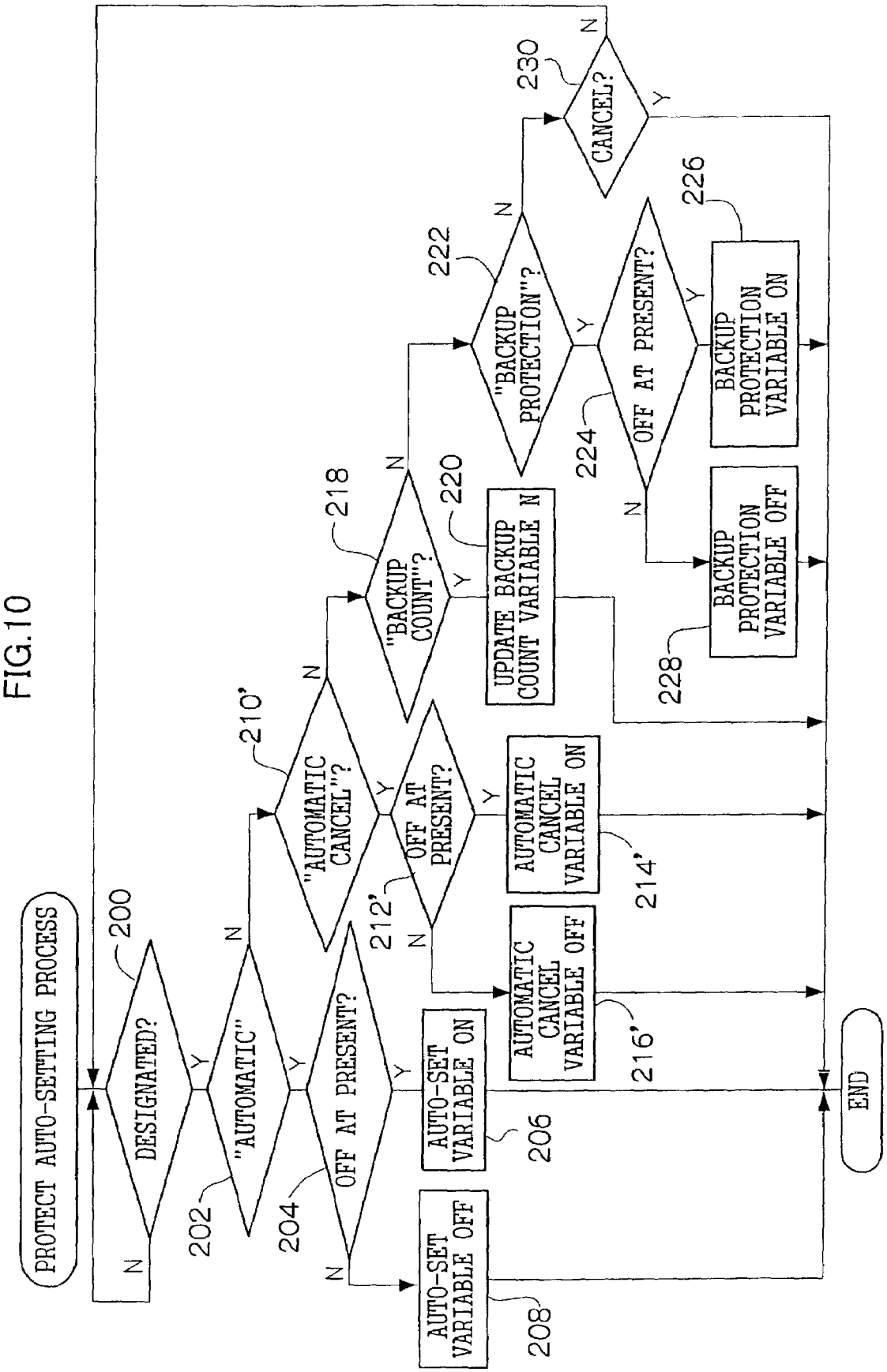
FIG. 10 is a flow chart showing a flow of processes in a protect automatic setting process program in the second embodiment of the present invention.

A protect auto-setting process executed in the digital camera 10 according to the second embodiment will be described below with reference to FIG. 10. FIG. 10 is a flowchart showing a flow of processes of the protect auto-setting process program executed by the CPU 36 of the digital camera 10 when the protect auto-setting process is executed depending on a designation input by a user. The same step numbers as in FIG. 7 denote the steps in which the same processes as in FIG. 7 are performed in FIG. 10, and a description thereof will be omitted.

Figure 11:
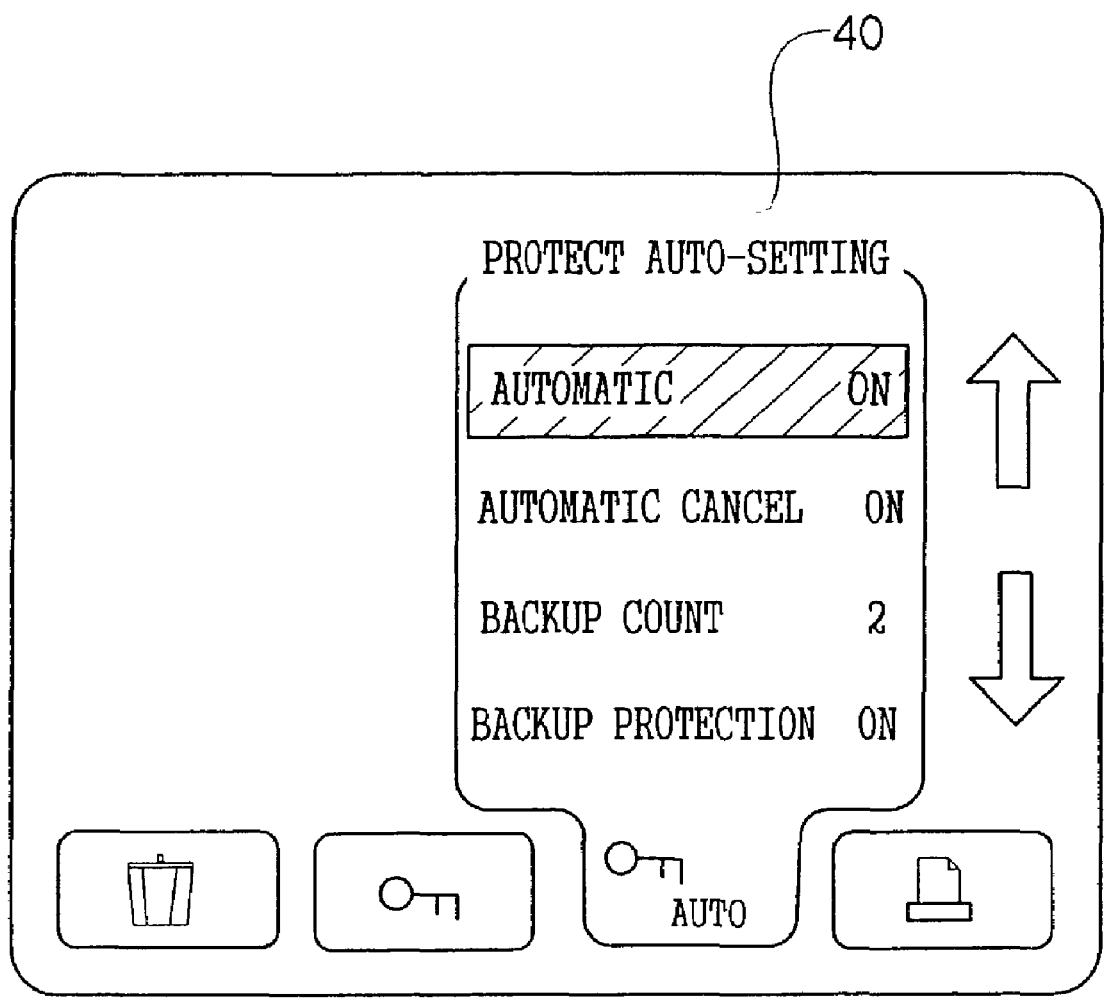
FIG. 11 is a schematic view showing a display of a protect automatic menu according to the second embodiment of the present invention.

The CPU 36 of the digital camera 10 according to the second embodiment displays a predetermined menu screen on the image monitor 40 when a user depresses the menu/execution switch 52 when the power switch 48 is in an ON state. In this state, the user selects a protect auto menu indicated by a key-shaped mark added with characters "AUTO" from the menu screen by operating the operation switch 42. In accordance with this, the CPU 36 displays the protect auto menu shown in FIG. 11 on the image monitor 40, and starts execution of the protect auto-setting process program according to the second embodiment. When the protect auto menu is displayed on the image monitor 40, the user designates a desired process from the menu by operating the operation switch 42.

In the "automatic cancel" of the protect auto menu, when a read-only attribute is set to an image file backed up by an external device, a process of automatically canceling the read-only attribute is performed. In the "backup count", a process of setting the number of times of backup of an image file to be canceled as a condition of cancel of a read-only attribute is performed when the "automatic cancel" is designated by the user. In the "automatic" and the "backup protection" in the menu, the same processes as those in the first embodiment are performed.

In step 210' in the protect auto-setting process program (see FIG. 10), it is determined whether a process designated by a user is the "automatic cancel" or not. When the determination is affirmed in step 210', the control flow shifts to step 212' to determine whether the value of an automatic cancel variable of the setting file is a value ('0' in this embodiment) indicating 'OFF' or not. When the determination is affirmed in step 212', after the control flow shifts to step 214' to update the value of the automatic cancel variable into a value ('1' in this embodiment) indicating 'ON', the protect auto-setting process program is ended. When the determination is negated in step 212', after the control flow shifts to step 216' to update the value of the automatic cancel variable into a value indicating 'OFF', this protect auto setting process program is ended. When the value of the automatic cancel variable indicates 'ON', 'ON is displayed at a position corresponding to the display "automatic cancel" in the menu. When the value of the automatic cancel variable indicates 'OFF', 'OFF' is displayed at a position corresponding to the display "automatic cancel" of the menu.

More specifically, in the processes in steps 212' to 216', when the "automatic cancel" is designated by a user, a setting for the automatic cancel variable at this time is inverted ('ON' when 'OFF' is set, and 'OFF' when 'ON' is set).

On the other hand, when the determination is negated in step 210', the control flow shifts to step 218.

Figure 12:
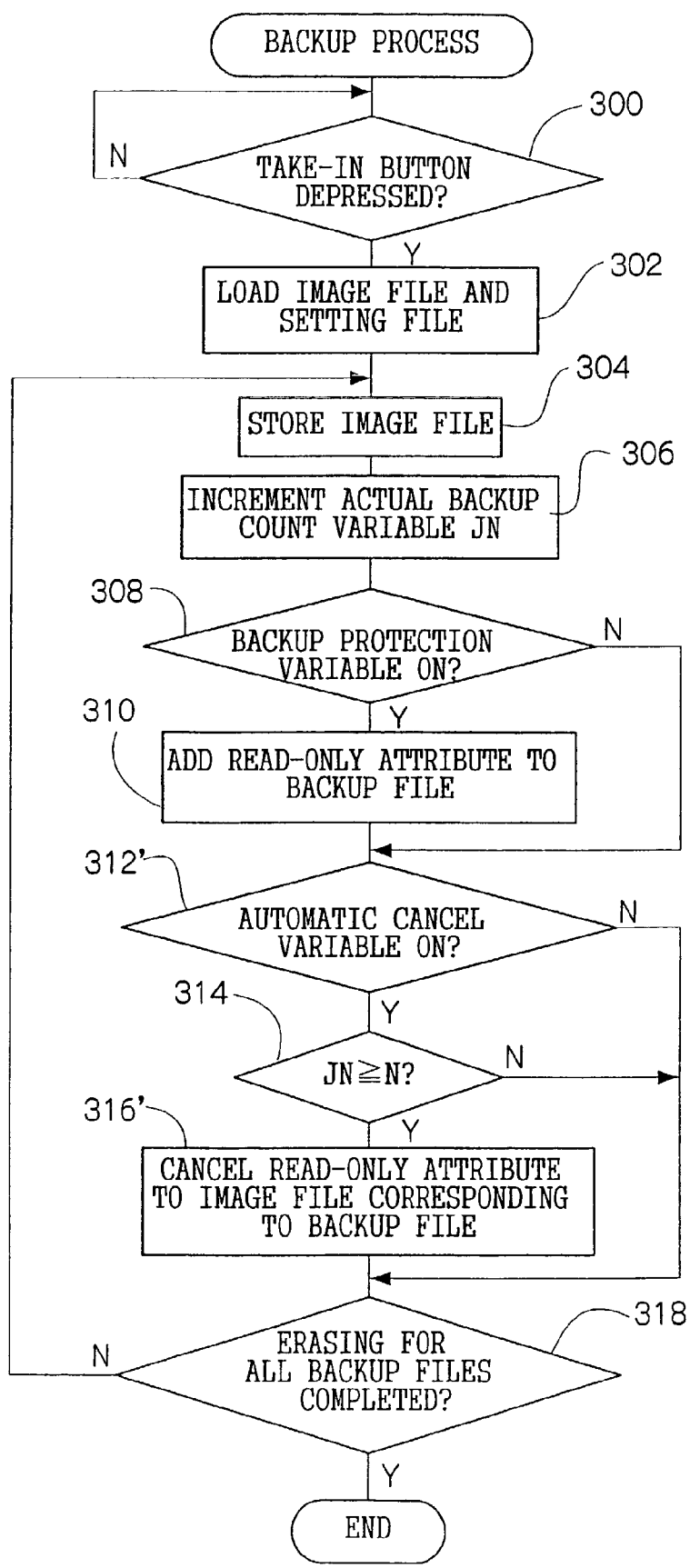
FIG. 12 is a flow chart showing a flow of processes of a backup process program in the second embodiment of the present invention.

A backup process executed by the personal computer 80 according to the second embodiment will be described below with reference to FIG. 12. FIG. 12 is a flow chart showing a flow of processes of a backup process program executed by the CPU 82 of the personal computer 80 when the digital camera 10 is loaded on the cradle 60 (see FIG. 3) and when the power switch 48 of the digital camera 10 is in an ON state. The program is stored in a predetermined area of the hard disk 86 in advance. The same step numbers as in FIG. 9 denote the steps in which the same processes as in FIG. 9 are performed in FIG. 12, and a description thereof will be omitted.

In step 312' in FIG. 12, it is determined whether the value of the automatic cancel variable in the setting file loaded in step 302 indicates 'ON' ('1' in this embodiment) or not. When the determination is affirmed in step 312', the control flow shifts to step 314. When the determination is negated in step 312', the control flow shifts to step 318.

On the other hand, in step 316', when the image file stored in the backup folder in step 304 is an image file to which a read-only attribute is set in the memory card 38 of the digital camera 10, the read-only attribute is canceled. Thereafter, the control flow shifts to step 318.

As described above in details, in the camera system according to this embodiment, the digital camera 10 stores image data obtained by photographing in the memory card 38 and transmits the image data stored in the memory card 38 to an external system, and the personal computer 80 receives the image data transmitted from the digital camera 10, stores (backs up) the received data in the hard disk 86, and performs control such that, when the image data stored in the hard disk 86 is image data to which a read-only attribute is set in the digital camera 10, the read-only attribute set to the image data is canceled. For this reason, the image data to which the read-only attribute is set is backed up, the image data can be made easily erasable.

In the camera system according to this embodiment, the digital camera 10 inputs count information (in this embodiment, the value of the backup count variable N) indicating the number of times of storage of image data to be canceled in the hard disk 86 as a condition of cancel of the read-only attribute, and the personal computer 80 performs control such that the read-only attribute of the image data are canceled when the image data to be erased is stored in the hard disk 86 the number of times indicated by the count information. For this reason, the risk that backup data of the image data are erased can be reduced.

In the camera system according to this embodiment, as designation information of the invention, information (in this embodiment, the value of an auto-set variable) which designates inhibition (in this embodiment, setting of a read-only attribute) of erasing of image data obtained by the subsequent photographing is applied. For this reason, the trouble of setting inhibition of erasing every photographing can be avoided, and the setting can be prevented from being forgotten when inhibition of erasing is set for respective pieces of image data at once upon completion of the photographing.

In addition, in the camera system according to this embodiment, the digital camera 10 inputs erasing inhibition information (in this embodiment, the value of a backup protection variable) indicating whether image data to be transmitted is inhibited from being erased or not, and the personal computer 80 performs control such that the inhibition of erasing of the image data from the hard disk 86 is set when the erasing inhibition information indicates inhibition of erasing. For this reason, the backup data can be protected.

Third Embodiment

In the third embodiment, a configuration of a digital camera according to the invention will be described below. Since the configuration of the digital camera 10 according to the third embodiment is the same as that of the digital camera 10 (see FIGS. 1A and 1B and FIG. 2) according to the first embodiment, a description thereof will be omitted.

Figure 13:
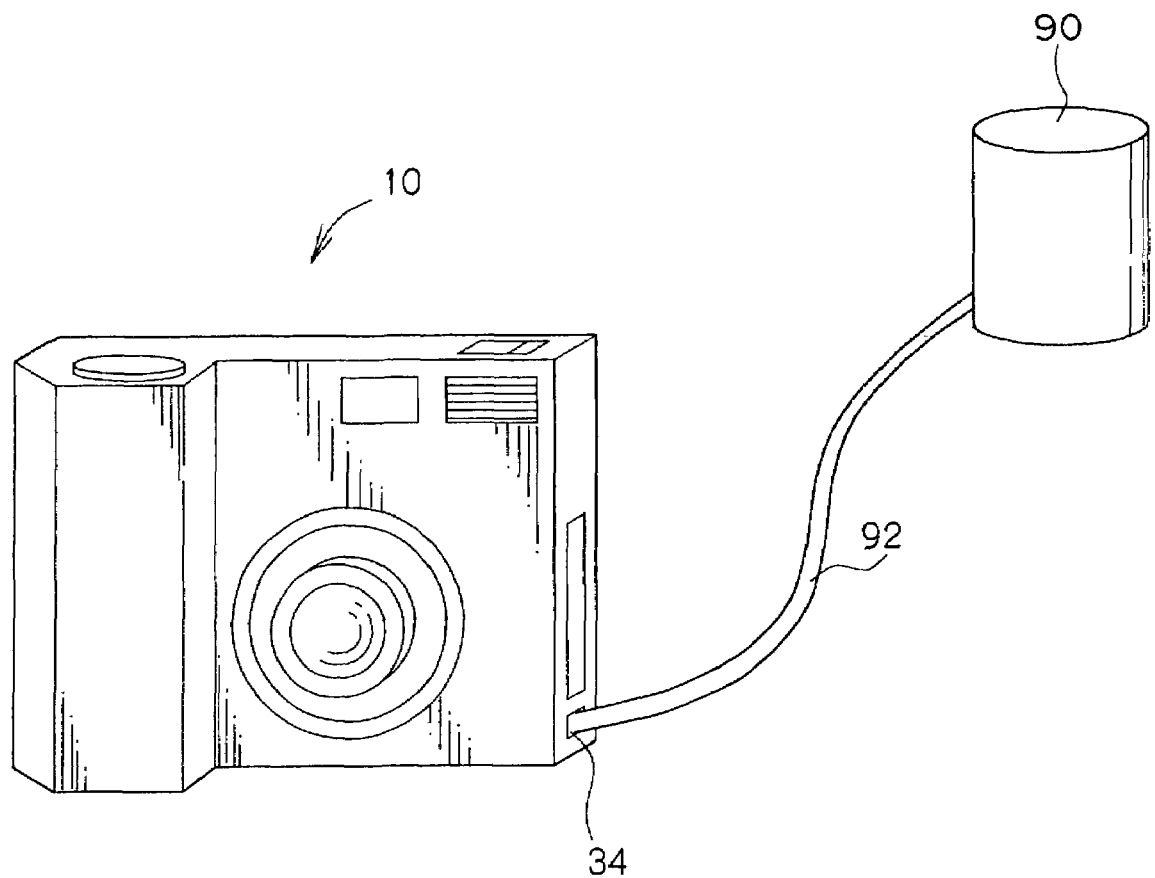
FIG. 13 is a schematic view showing a connection state between a digital camera and a hard disk according to the third embodiment of the present invention.

FIG. 13 shows a connection state of the digital camera 10 according to the third embodiment and a hard disk 90 serving as an external storage device. As shown in FIG. 13, the digital camera 10 and the hard disk 90 according to the third embodiment are connected to each other such that a digital I/F 34 of the digital camera 10 and a digital interface (not shown) of the hard disk 90 are connected through an I/F cable 92.

On the hard disk 90, a backup folder for backing up and storing an image file stored in the memory card 38 of the digital camera 10 is formed in advance. A variable (to be referred to as an "actual backup count variable JN" hereinafter) indicating the number of times of storage of each image file for the backup folder is stored as a file (to be referred to as an "actual backup count file" hereinafter) in text format.

The memory card 38 corresponds to the storage component, the operation switch 42 corresponds to the input component, the CPU 36 corresponds to the setting component and the control component, and the hard disk 90 corresponds to an external storage device.

An operation of the digital camera 10 according to the third embodiment will be described below. In the digital camera 10 according to the third embodiment, although the same protect setting process (see FIG. 5) and the protect auto-setting process (see FIG. 7) as those of the first embodiment are executed, these processes will be omitted in this description.

Figure 14:
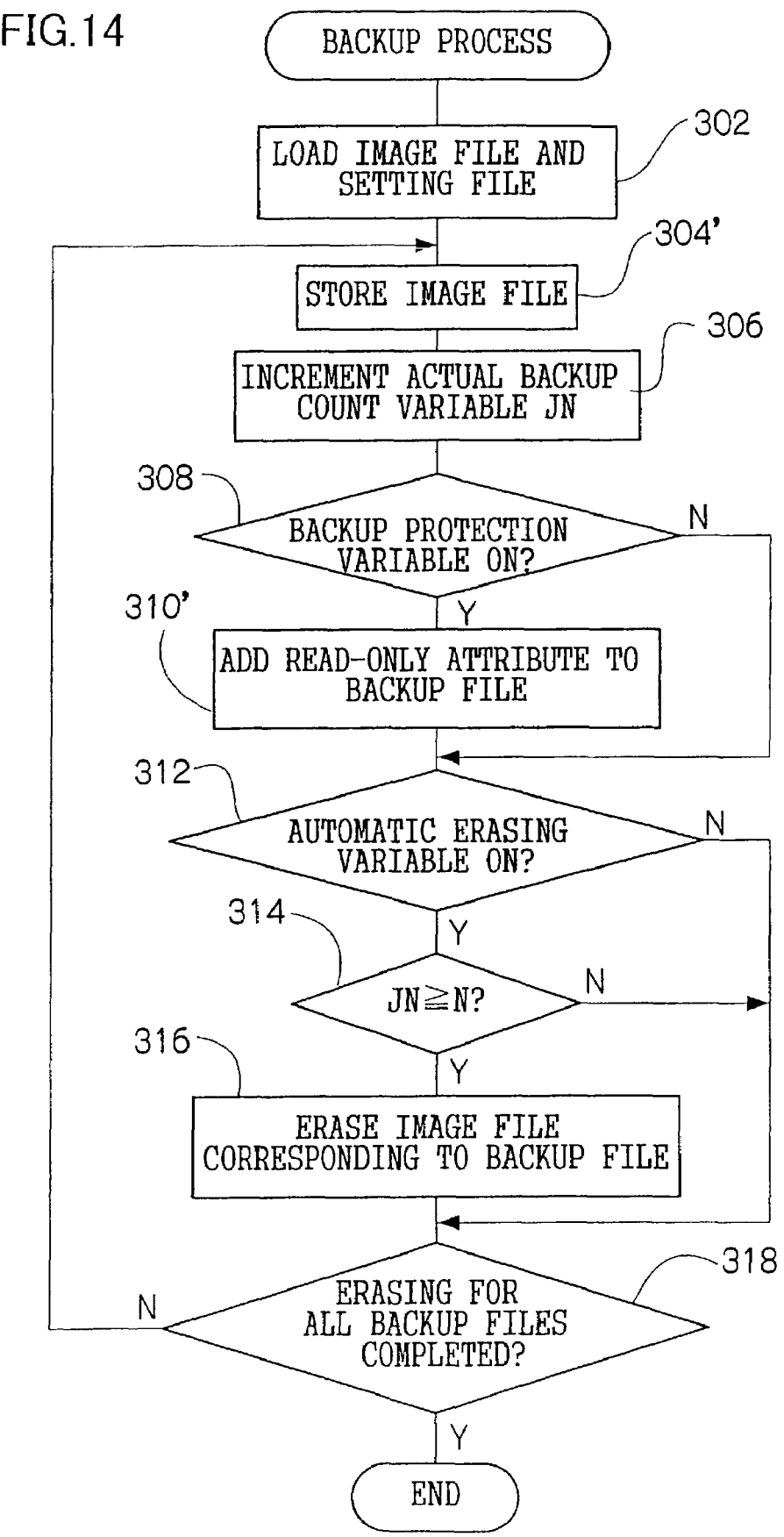
FIG. 14 is a flow chart showing a flow of processes of a backup process program according to the third embodiment of the present invention.
Figure 15A:
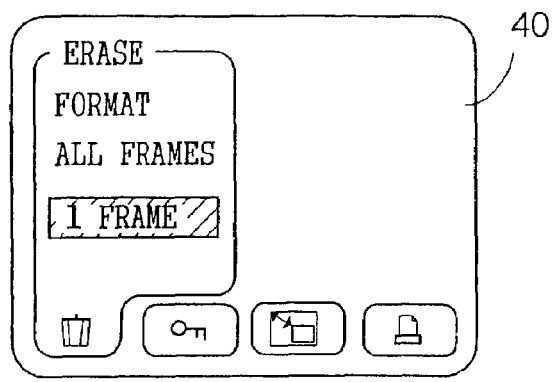
FIGS. 15A to 15D are schematic views applied to explanation of a conventional art.
Figure 15B:
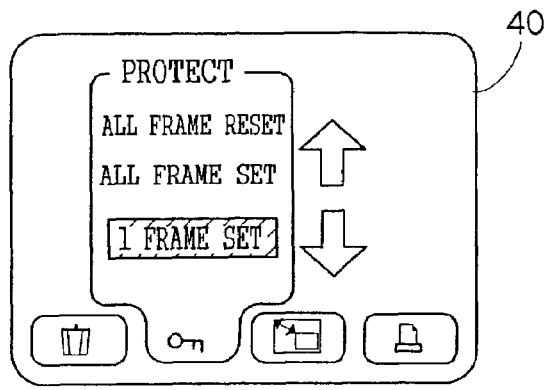
Figure 15C:
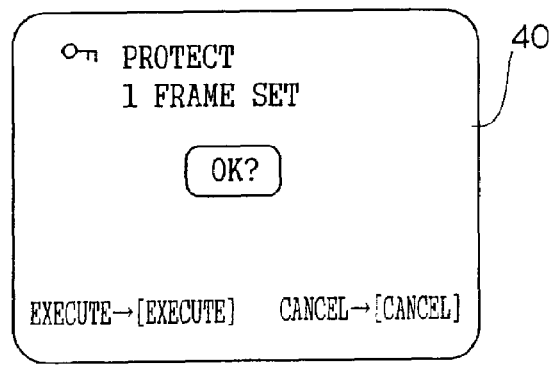
Figure 15D:
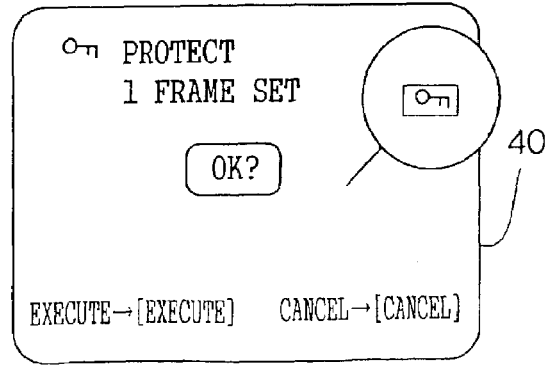
Figure 16A:
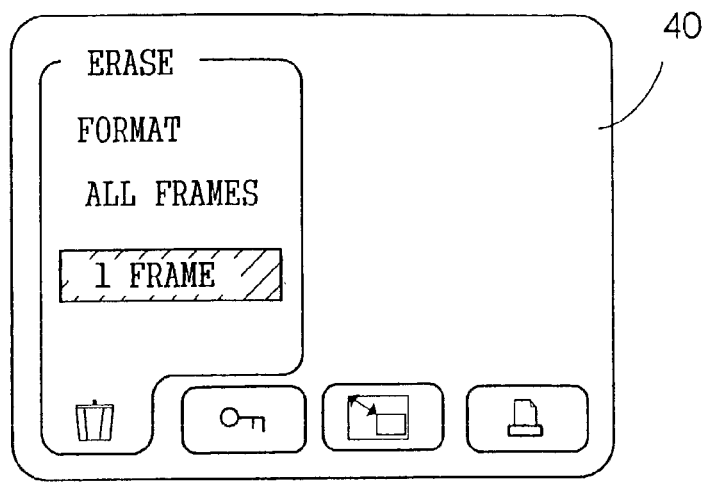
FIGS. 16A to 16C are schematic views applied to explanation of a conventional art.
Figure 16B:
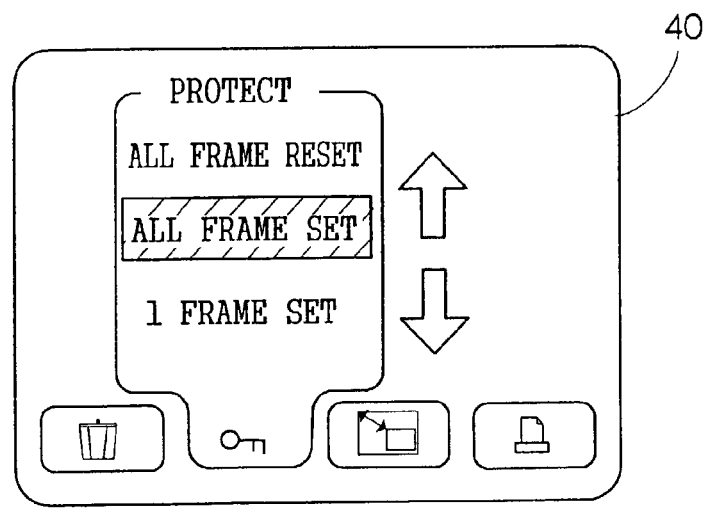
Figure 16C:
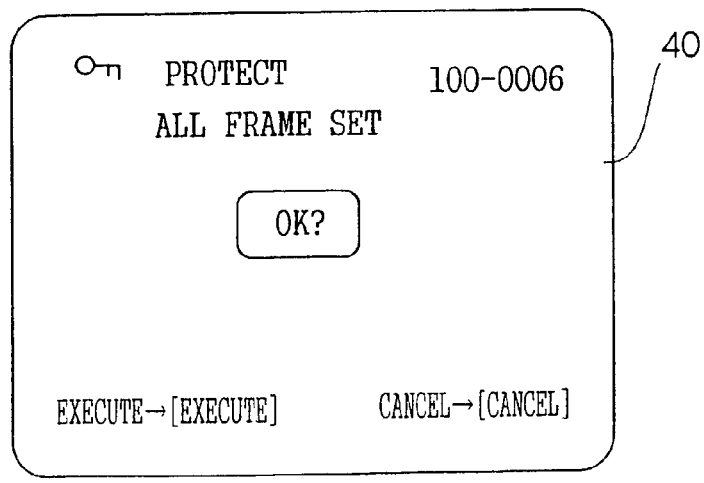

A backup process executed in the digital camera 10 according to the third embodiment will be described below with reference to FIG. 14. FIG. 14 is a flow chart showing a flow of processes of the backup process program executed as an interrupting process by the CPU 36 of the digital camera 10 when a backup button (not shown) arranged on the digital camera 10 is depressed by a user. In the backup process program, the same processes as those in the backup process program (see FIG. 9) executed by the personal computer 80 in the first embodiment are executed. The same step numbers as in FIG. 9 denote the steps in which the same processes as in FIG. 9 are performed in FIG. 14, and a description thereof will be omitted.

In step 304' in FIG. 14, an image file of one file of image files loaded from the memory card 38 in step 302 is stored in a backup folder of the hard disk 90. In this case, when the image file having the same name as that of the stored image file exists in the backup folder, the image file is stored such that the extension of the file name is partially changed. When no image file having the same file name as that of the stored image file exists, '0' is stored in an actual backup count file of the hard disk 90 as the value of the actual backup count variable JN corresponding to the file name except for the extension of the image file.

In step 310', after the read-only attribute of the image file stored in the backup folder is added in step 304', the control flow shifts to step 312. Note that the read-only attribute is added to the FAT set on the hard disk 90.

As described above in detail, in the digital camera according to this embodiment, image data obtained by photographing is stored in the memory card 38, the image data stored in the memory card 38 is stored (backed up) in the hard disk 90, and control is performed such that the image data stored in the hard disk 90 is erased from the memory card 38. For this reason, the trouble of erasing the image data, which is backed up from the memory card 38, can be avoided.

In the digital camera according to this embodiment, count information (in this embodiment, a value indicated by a backup count variable) indicating the number of times of storage of image data to be erased in the hard disk 90 is input as a condition of erasing from the memory card 38, and control is performed such that the image data are erased from the memory card 38 when the image data to be erased is stored in the hard disk 90 the number of times indicated by the count information. For this reason, the risk that backup data of the image data are erased can be reduced.

In the digital camera according to this embodiment, as designation information of the invention, information (in this embodiment, the value of an auto-set variable) which designates inhibition (in this embodiment, setting of a read-only attribute) of erasing of image data obtained by the subsequent photographing is applied. For this reason, the trouble of setting inhibition of erasing every photographing can be avoided, and the setting can be prevented from being forgotten when inhibition of erasing is set for respective pieces of image data at once upon completion of the photographing.

In addition, in the digital camera according to this embodiment, erasing inhibition information (in this embodiment, the value of a backup protection variable) indicating whether image data to be stored in the hard disk 90 is inhibited from being erased or not, and control is performed such that the inhibition of erasing of the image data from the hard disk 90 is set when the erasing inhibition information indicates inhibition of erasing of the image data from the hard disk 90. For this reason, the backup data can be protected.

On the other hand, in a method for controlling a digital camera according to this embodiment, control is performed such that image data stored in the hard disk 90 is erased from the memory card 38. For this reason, the trouble of erasing the image data, which is backed up from the memory card 38, can be avoided.

In this embodiment, the configuration obtained when an image file backed up by the hard disk 90 the number of times set as the backup count variable is erased from the memory card 38 of the digital camera 10 has been described. However, the invention is not limited to this configuration, and a configuration in which, when an image file backed up by the hard disk 90 the number of times set as the backup count variable is an image file to which a read-only attribute is set in the memory card 38, the read-only attribute is canceled may also be employed. The processes performed in this case are substantially the same as the processes described in the second embodiment, a description thereof will be omitted.

In the digital camera in this case, an image data obtained by photographing is stored in the memory card 38, the image data stored in the memory card 38 is stored in the hard disk 90, and control is performed such that inhibition of erasing set to the image data is canceled when the image data stored in the hard disk 90 is image data to which the inhibition of erasing is set. For this reason, the image data inhibited from being erased can be made easily erasable when the image data are backed up. Furthermore, in the method for controlling a digital camera in this case, image data obtained by photographing and stored in the memory card 38 is stored in the hard disk 90, and control is performed such that inhibition of erasing set to the image data is canceled when the image data are image data to which the inhibition of erasing from the memory card 38 is set. For this reason, the image data inhibited from being erased can be made easily erasable when the image data are backed up.

The first and second embodiments have described the case in which the USB is applied as the interface standard between the transmission component and the reception component in the invention. However, the invention is not limited to the standard, and, for example, any interface standards such as RS-232C can be applied, as a matter of course. In this case, the same effects as those in the respective embodiments can be achieved.

The embodiments have described the case in which the setting contents of various processes performed by a user are stored by a setting files. However, the invention is not limited to the configuration, and, for example, a configuration in which the setting contents are stored in a tag of an image file to be processed can also be employed. In this case, the same effects as those in the respective embodiments can be achieved.

The embodiments have described the case in which the memory card 38 is applied as the storage component of the invention. However, the invention is not limited to the configuration, and a configuration in which the memory 26 is applied as the storage component of the invention can be employed. In this case, the same effects as those in the respective embodiments can be achieved.

Furthermore, the flows (see FIGS. 5, 7, 9, 10, 12, and 14) of various processes described in these embodiments are only examples, and can be appropriately changed without departing from the spirit and scope of the invention.

What is claimed is:
1. A camera system, comprising:
a digital camera that includes
a storage component for storing image data obtained by photographing;
a transmission component for transmitting the stored image data in the storage component to an external system;
an input component for inputting designation information for designating the image data to be inhibited from being erased from the storage component; and a setting component for setting an inhibition of erasing of the image data in response to the designation information; and an external device that includes a reception component for receiving the image data transmitted by the transmission component;

a backup storage component for storing the image data received by the reception component; and a control component for performing control such that the inhibition of erasing set to the image data in the storage component is canceled when the image data stored in the backup storage component is image data to which the inhibition of erasing has been set, wherein the input component further inputs count information indicating the number of times the image data to which the inhibition of erasing has been set is to be stored in the backup storage component as a condition of cancellation of the inhibition of erasing performed by the control component, the transmission component further transmits the count information to the external system, the reception component further receives the count information, and the control component performs control so that the inhibition of erasing set to the image data is canceled when the image data to which the inhibition of erasing has been set is stored in the backup storage component the number of times indicated by the count information.

2. The camera system of claim 1, wherein canceling the inhibition of erasing only makes a status change that indicates that the image data is not protected from being erased and is different from erasing the image data from the storage component.

3. The camera system of claim 1, wherein the control component performs control so that the image data stored in the backup storage component is erased from the storage component.

4. The camera system of claim 1, wherein the designation information designates image data, which was obtained by the subsequent photographing, to be inhibited from being erased.

5. The camera system of claim 1, wherein the input component further inputs erasing inhibition information indicating whether the image data transmitted by the transmission component is inhibited from being erased or not, wherein the transmission component further transmits the erasing inhibition information to an external system, wherein the reception component further receives the erasing inhibition information, and wherein the control component performs control so that inhibition of erasing of the image data from the backup storage component is set when the erasing inhibition information indicates that erasing is inhibited.

6. A digital camera, comprising:

a storage component for storing image data obtained by photographing;

an input component for inputting designation information that designates the image data to be inhibited from being erased from the storage component;

a setting component for setting inhibition of erasing of the image data in accordance with the designation information;

an external storage component for storing the image data stored in the storage component in an external storage device; and a control component for performing control so that an inhibition of erasing set to the image data in the storage component is canceled when the image data stored in the external storage device by the external storage component is image data to which the inhibition of erasing is set, wherein the input component further inputs count information indicating the number of times the image data to which the inhibition of erasing has been set is to be stored in the external storage device as a condition of cancellation of the inhibition of erasing performed by the control component, and wherein the control component performs control so that the inhibition of erasing set to the image data is canceled when the image data to which the inhibition of erasing has been set is stored in the external storage device the number of times indicated by the count information.

7. The digital camera of claim 6, wherein canceling the inhibition of erasing only makes a status change that indicates that the image data is not protected from being erased and is different from erasing the image data from the storage component immediately.

8. The digital camera of claim 6, wherein the control component controls erasure of the image data from the storage component, when the image data is stored in the external storage device.

9. The digital camera of claim 6, wherein the designation information designates image data obtained by the subsequent photographing to be inhibited from being erased.

10. The digital camera of claim 6, wherein the input component further inputs erasing inhibition information indicating whether the image data stored in the external storage device is inhibited from being erased from the external storage device or not, and wherein the control component performs control so that inhibition of erasing of the image data from the external storage device is set when the erasing inhibition information indicates that erasing is inhibited.

11. A method for controlling a digital camera including a storage component for storing image data obtained by photographing, comprising the steps of:

inputting count information indicating a number of times the image data is to be stored as a condition of canceling an inhibition of erasing set to the image data;

storing the image data stored in the storage component in an external storage device; and canceling the inhibition of erasing set to the image data in the storage component only when the image data to which the inhibition of erasing has been set is stored in an external storage device the number of times indicated by the count information.

12. The method for controlling a digital camera of claim 11, wherein canceling the inhibition of erasing only makes a status change that indicates that the image data is not protected from being erased and is different from erasing the image data from the storage component immediately.

13. The method for controlling a digital camera of claim 11, further comprising the steps of:

inputting designation information for designating inhibition of erasing of the image data; and setting inhibition of erasing of the image data obtained by photographing performed after the designation information has been input.

14. The method for controlling a digital camera of claim 11, further comprising the steps of:
   inputting erasing inhibition information indicating whether the image data to be stored in the external storage device is inhibited from being erased from the external storage device or not; and
   setting inhibition of erasing of the image data from the external storage device when the erasing inhibition information indicates that erasing is inhibited.

15. A method for controlling a digital camera including a storage component for storing image data obtained by photographing, comprising the steps of:
   inputting count information indicating a number of times the image data is to be stored as a condition of canceling an inhibition of erasing the image data; storing the image data stored in the storage component in an external storage device; and
   automatically erasing the image data from the storage component only after storing the image data in an external storage device the number of times indicated by the count information without querying the user when the image data are set to be inhibited from being erased from the storage component.

16. The method for controlling a digital camera of claim 15, further comprising the steps of:
   inputting designation information for designating inhibition of erasing of the image data; and
   setting inhibition of erasing of the image data obtained by photographing performed after the designation information has been input.

17. The method for controlling a digital camera of claim 15, further comprising the steps of:
   inputting erasing inhibition information indicating whether the image data to be stored in the external storage device is inhibited from being erased from the external storage device or not; and
   setting inhibition of erasing of the image data from the external storage device when the erasing inhibition information indicates that erasing is inhibited.

18. The camera system of claim 1, wherein the setting component of the digital camera sets the inhibition of the erasing of the image data for all image data obtained subsequent to the input component of the digital camera setting the designation information.

19. The camera of claim 6, wherein the setting component sets the inhibition of the erasing of the image data for all image data obtained subsequent to the input component setting the designation information.

20. The method for controlling a digital camera of claim 11, further comprising the steps of:
   inputting designation information for designating inhibition of erasing of the image data; and
   setting inhibition of erasing of all image data obtained by photographing performed subsequent to the designation information having been input.

21. The method for controlling a digital camera of claim 15, further comprising the steps of:
   inputting designation information for designating inhibition of erasing of the image data; and
   setting inhibition of erasing of all image data obtained by photographing performed subsequent to the designation information having been input.

22. The camera system of claim 1, wherein the setting component of the digital camera sets the inhibition of the erasing of the image data by setting an attribute of the image data and the control component of the external device cancels the inhibition of the erasing of the image data by unsetting the attribute of the image data.

23. The camera system of claim 22, wherein the attribute is a read-only attribute.

24. The camera of claim 6, wherein the setting component sets the inhibition of the erasing of the image data by setting an attribute of the image data and the control component cancels the inhibition of the erasing of the image data by unsetting the attribute of the image data.

25. The camera of claim 24, wherein the attribute is a read-only attribute.

26. The method for controlling a digital camera of claim 11, wherein the step of canceling the inhibition of erasing comprises:
   determining if an attribute of the image data is set; and
   unsetting the attribute of the image data when it is determined that the attribute of the image data is set.

27. The method for controlling a digital camera of claim 26, wherein the attribute is a read-only attribute.

28. The method for controlling a digital camera of claim 15, wherein the step of canceling the inhibition of erasing comprises:
   determining if an attribute of the image data is set; and
   unsetting the attribute of the image data when it is determined that the attribute of the image data is set.

29. The method for controlling a digital camera of claim 28, wherein the attribute is a read-only attribute.

30. A digital camera, comprising:
   a storage component configured to store image data obtained by photographing;
   an input component configured to set an auto-set mode based on a selection by a user; and
   a setting component configured to set a protection attribute of the image data to indicate that the image data is protected for all image data obtained subsequent to the setting of the auto-set mode by the input component,
   wherein the input component is further configured to set a count variable, the count variable representing a minimum number of back up copies of the image data is to be stored in the external system before the protection attribute of the image data in the storage component can be unset.

31. The digital camera of claim 30, wherein the protection attribute is a read-only attribute.

32. The digital camera of claim 30, further comprising a transmission component configured to transmit image data stored in the storage component to an external system.

33. The digital camera of claim 32,
   wherein the transmission component is configured to transmit the count variable to the external system.

34. digital camera of claim 32,
   wherein the input component is configured to set a count variable, the count variable representing a minimum number of back up copies of the image data is to be stored in the external system before the image data in the storage component can be erased, and
   wherein the transmission component is configured to transmit the count variable to the external system.

35. The digital camera of claim 30, further comprising:
   an interface component configured to interface with an external storage device; and
   a control component configured to control a process to backup the image data stored in the storage component to the external storage device through the interface component.

36. The digital camera of claim 35,
wherein the control component is configured to copy the image data to the external storage device, and
unset the protection attribute of the image data in the storage component after successfully copying the image data, and
wherein unsetting the protection attribute of the image data only indicates that the image data is not protected from being erased and is different from erasing the image data from the storage component immediately.

37. The digital camera of claim 35,
wherein the input component is configured to set a count variable,
wherein the control component is configured to copy the image data to the external storage device,
determine, after successfully copying the image data, whether or not a number of copies of the image data in the external storage device is equal to or greater than the count variable, and
unset the protection attribute of the image data in the storage component if it is determined that the number of copies of the image data in the external storage device is equal to or greater than the count variable, and
wherein unsetting the protection attribute of the image data only indicates that the image data is not protected from being erased and is different from erasing the image data from the storage component immediately.

38. The digital camera of claim 35, wherein the control component is configured to
copy the image data to the external storage device, and
erase the image data from the storage component after successfully copying the image data.

39. The digital camera of claim 35,
wherein the input component is configured to set a count variable, and
wherein the control component is configured to copy the image data to the external storage device,
determine, after successfully copying the image data, whether or not a number of copies of the image data in the external storage device is equal to or greater than the count variable, and
erase the image data from the storage component if it is determined that the number of copies of the image data in the external storage device is equal to or greater than the count variable.

40. The digital camera of claim 30,
wherein unsetting the protection attribute of the image data only indicates that the image data is not protected from being erased and is different from erasing the image data from the storage component immediately.

41. The camera system of claim 1, wherein the designation information is inputted by a user and the setting component sets the inhibition of erasing to user-designated ones of the image data.

42. The camera system of claim 1, wherein the count information indicates a specific number of times the image data to which the inhibition of erasing has been set is to be stored in the backup storage component as a condition of cancellation of the inhibition of erasing performed by the control component, and wherein the specific number is inputted by a user.

43. The digital camera of claim 6, wherein the designation information is inputted by a user and the setting component sets the inhibition of erasing to user-designated ones of the image data.

44. The digital camera of claim 6, wherein the count information indicates a specific number of times the image data to which the inhibition of erasing has been set is to be stored in the backup storage component as a condition of cancellation of the inhibition of erasing performed by the control component, and wherein the specific number is inputted by a user.

45. The method of claim 13, wherein the designation information is inputted by a user and the inhibition of erasing is set to user-designated ones of the image data.

46. The method of claim 11, wherein the count information indicates a specific number of times the image data is to be stored as a condition of canceling the inhibition of erasing set to the image data, and wherein the specific number is inputted by a user.

47. The method of claim 16, wherein the designation information is inputted by a user and the inhibition of erasing is set to user-designated ones of the image data.

48. The method of claim 15, wherein the count information indicates a specific number of times the image data is to be stored as a condition of canceling the inhibition of erasing the image data, and wherein the specific number is inputted by a user.

49. The digital camera of claim 30, wherein the minimum number of back-up copies is configured according to a selection by the user.

* * * * *